US012693664B2

(12) United States Patent
Sneyders et al.

(10) Patent No.: US 12,693,664 B2
(45) Date of Patent: Jul. 28, 2026

(54) GUIDANCE SYSTEM TO NAVIGATE INTERVENING OBSTACLES AND METHODS FOR SAME

(71) Applicant: Raven Industries, Inc., Sioux Falls, SD (US)

(72) Inventors: Yuri Sneyders, Zemst (BE); Jeffrey Allen Van Roekel, Sioux Falls, SD (US); Matthew K. Rust, Chandler, AZ (US); Rahul Ramakrishnan, Chandler, AZ (US); Jared Ernest Kocer, Sioux Falls, SD (US); Anthony Douglas Johnson Schmidt, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 567 days.

(21) Appl. No.: 17/836,616

(22) Filed: Jun. 9, 2022

(65) Prior Publication Data

US 2022/0397906 A1 Dec. 15, 2022

Related U.S. Application Data

(60) Provisional application No. 63/275,373, filed on Nov. 3, 2021, provisional application No. 63/208,878, filed on Jun. 9, 2021.

(51) Int. Cl.
*A01B 69/04* (2006.01)
*G05D 1/00* (2006.01)

(52) U.S. Cl.
CPC ......... *G05D 1/0214* (2013.01); *A01B 69/008* (2013.01); *G05D 1/0238* (2013.01); *G05D 1/0257* (2013.01)

(58) Field of Classification Search
CPC .... A01B 69/008; G01C 21/20; G05D 1/0214; G05D 1/0217; G05D 1/0238;
(Continued)

(56) References Cited

U.S. PATENT DOCUMENTS

| | | | |
|---|---|---|---|
| 7,980,808 B2 * | 7/2011 | Chilson | ................... B60L 15/38 701/500 |
| 2008/0103690 A1 * | 5/2008 | Dix | ...................... G05D 1/0278 701/50 |

(Continued)

FOREIGN PATENT DOCUMENTS

| | | |
|---|---|---|
| EP | 3623759 | 3/2020 |
| WO | 2020037003 | 2/2020 |
| WO | 2022261329 | 12/2022 |

OTHER PUBLICATIONS

"International Application Serial No. PCT US2022 032847, International Preliminary Report on Patentability mailed Dec. 21, 2023", 7 pgs.

(Continued)

*Primary Examiner* — Fadey S. Jabr
*Assistant Examiner* — Michael J Herrera
(74) *Attorney, Agent, or Firm* — Schwegman Lundberg & Woessner, P.A.

(57) ABSTRACT

A system having a guidance module to obtain a travel path from an agricultural machine to a target. The guidance module including a perception module to determine target line that extends from the machine to the target, and obstacle detection module to detect an obstacle in the first target line, the obstacle having an obstacle boundary that intersects the target line. The guidance module including a mitigation module to obtain a mitigation path around the obstacle based on the target line and the obstacle boundary, the mitigation path including a mitigation segment. The mitigation module including an entrance module configured to determine a (Continued)

starting position of the mitigation path based on a second target line and an exit module configured to determine the ending position of the mitigation path based on a third target line. The guidance module including convergence module to combine the mitigation path with the travel path.

36 Claims, 16 Drawing Sheets

(58) Field of Classification Search
CPC .. G05D 1/0246; G05D 1/0257; G06Q 10/047; G06Q 50/02; G06V 20/58; G06V 20/588
See application file for complete search history.

(56) References Cited

U.S. PATENT DOCUMENTS

| | | | | |
|---|---|---|---|---|
| 2014/0025201 | A1* | 1/2014 | Ryu | G05D 1/02 |
| | | | | 700/245 |
| 2016/0057920 | A1* | 3/2016 | Spiller | A01B 79/005 |
| | | | | 701/50 |
| 2017/0354079 | A1* | 12/2017 | Foster | G05D 1/0276 |
| 2018/0359904 | A1 | 12/2018 | Foster et al. | |
| 2018/0373264 | A1* | 12/2018 | Madsen | G05D 1/0088 |
| 2020/0089239 | A1* | 3/2020 | Navarro | G06Q 50/40 |
| 2023/0292645 | A1* | 9/2023 | Ishikawa | A01B 69/00 |
| | | | | 701/25 |

OTHER PUBLICATIONS

"International Application Serial No. PCT US2022 032847, International Search Report mailed Sep. 27, 2022", 5 pgs.
"International Application Serial No. PCT US2022 032847, Written Opinion mailed Sep. 27, 2022", 5 pgs.
"Australian Application Serial No. 2022289723, First Examination Report mailed Oct. 10, 2024", 4 pgs.
"Australian Application Serial No. 2022289723, Response filed Jan. 17, 2025 to First Examination Report mailed Oct. 10, 2024", 69 pgs.
"European Application Serial No. 22738149.8, Communication Pursuant to Article 94(3) EPC mailed Mar. 18, 2025", 4 pgs.

* cited by examiner

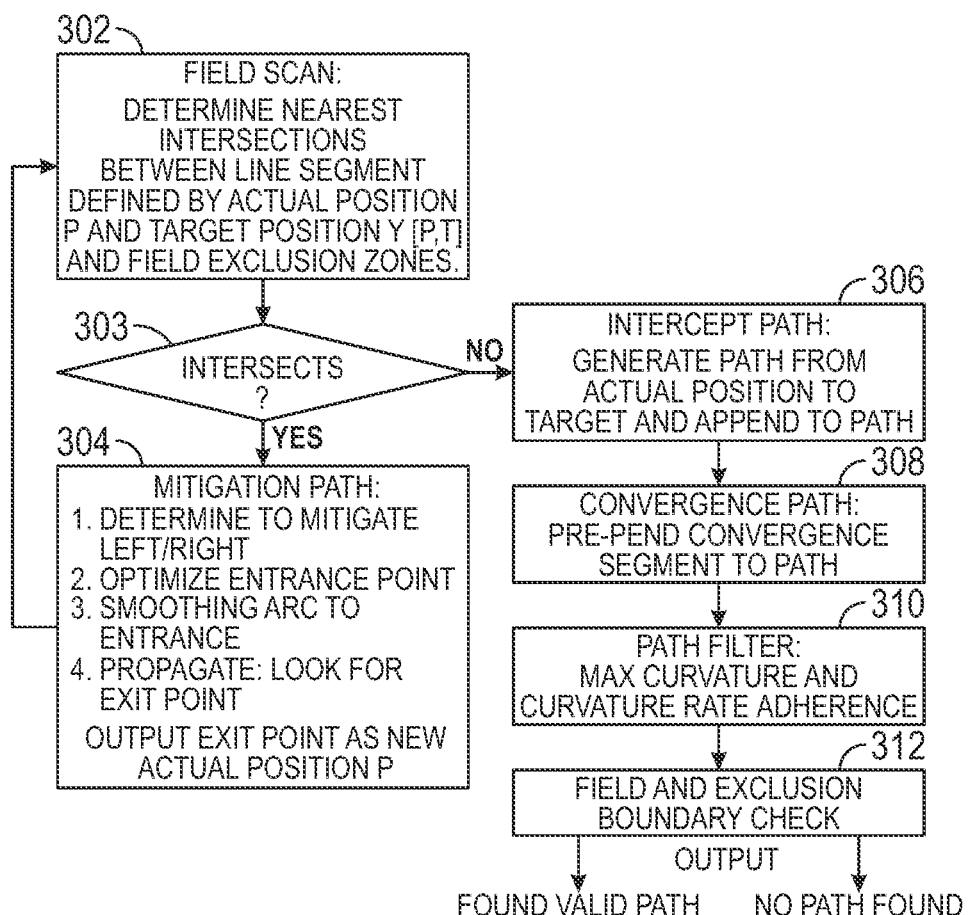

302

FIELD SCAN:
DETERMINE NEAREST
INTERSECTIONS
BETWEEN LINE SEGMENT
DEFINED BY ACTUAL POSITION
P AND TARGET POSITION Y [P,T]
AND FIELD EXCLUSION ZONES.

303
INTERSECTS
?

NO

306
INTERCEPT PATH:
GENERATE PATH FROM
ACTUAL POSITION TO
TARGET AND APPEND TO PATH

YES

304
MITIGATION PATH:
1. DETERMINE TO MITIGATE
   LEFT/RIGHT
2. OPTIMIZE ENTRANCE POINT
3. SMOOTHING ARC TO
   ENTRANCE
4. PROPAGATE: LOOK FOR
   EXIT POINT

OUTPUT EXIT POINT AS NEW
ACTUAL POSITION P

308
CONVERGENCE PATH:
PRE-PEND CONVERGENCE
SEGMENT TO PATH

310
PATH FILTER:
MAX CURVATURE AND
CURVATURE RATE ADHERENCE

312
FIELD AND EXCLUSION
BOUNDARY CHECK

OUTPUT

FOUND VALID PATH          NO PATH FOUND

FIG. 3

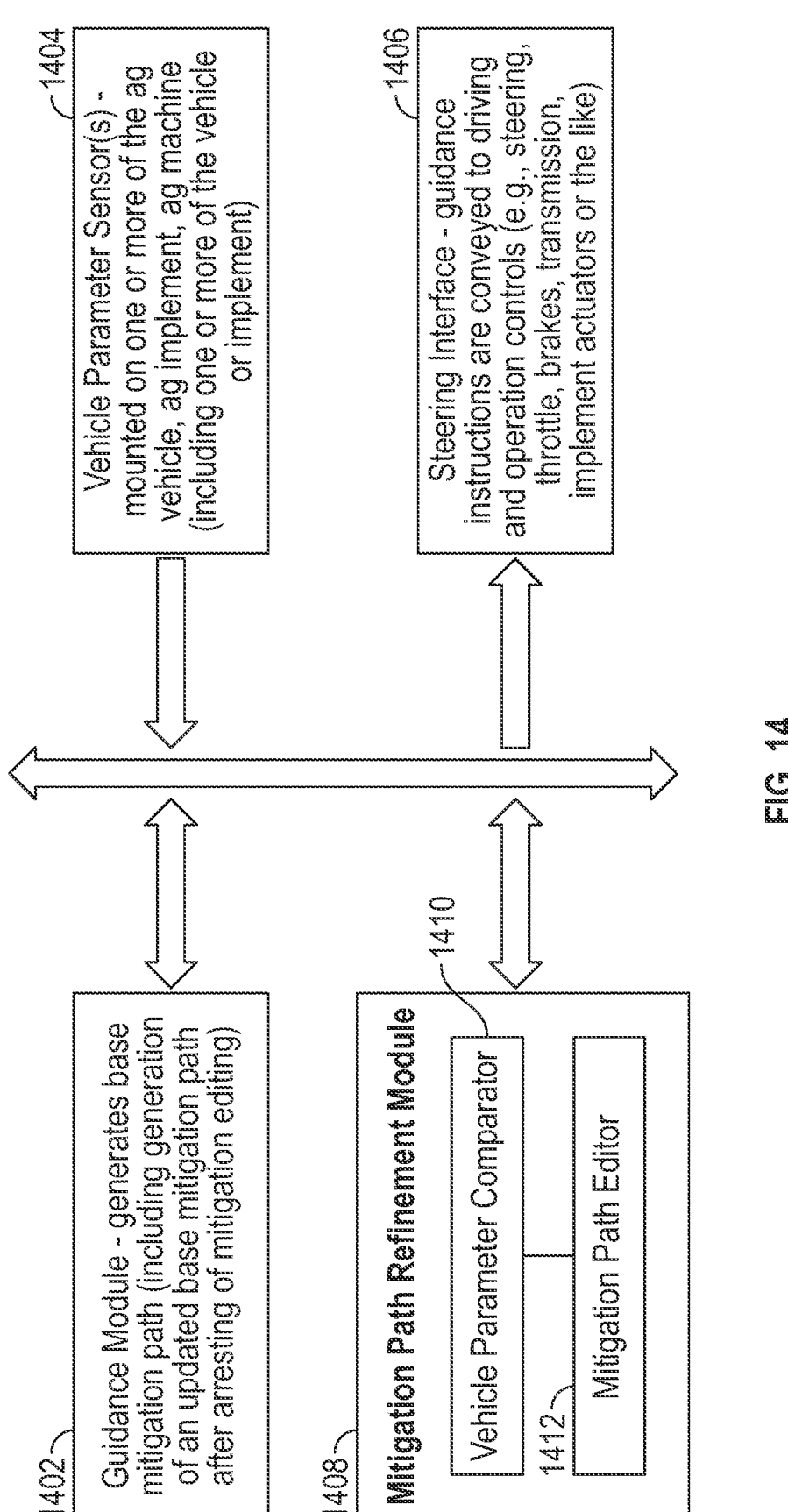

1404

Vehicle Parameter Sensor(s) - mounted on one or more of the ag vehicle, ag implement, ag machine (including one or more of the vehicle or implement)

1406

Steering Interface - guidance instructions are conveyed to driving and operation controls (e.g., steering, throttle, brakes, transmission, implement actuators or the like)

1402

Guidance Module - generates base mitigation path (including generation of an updated base mitigation path after arresting of mitigation editing)

1408

Mitigation Path Refinement Module

1410

Vehicle Parameter Comparator

1412

Mitigation Path Editor

FIG. 14

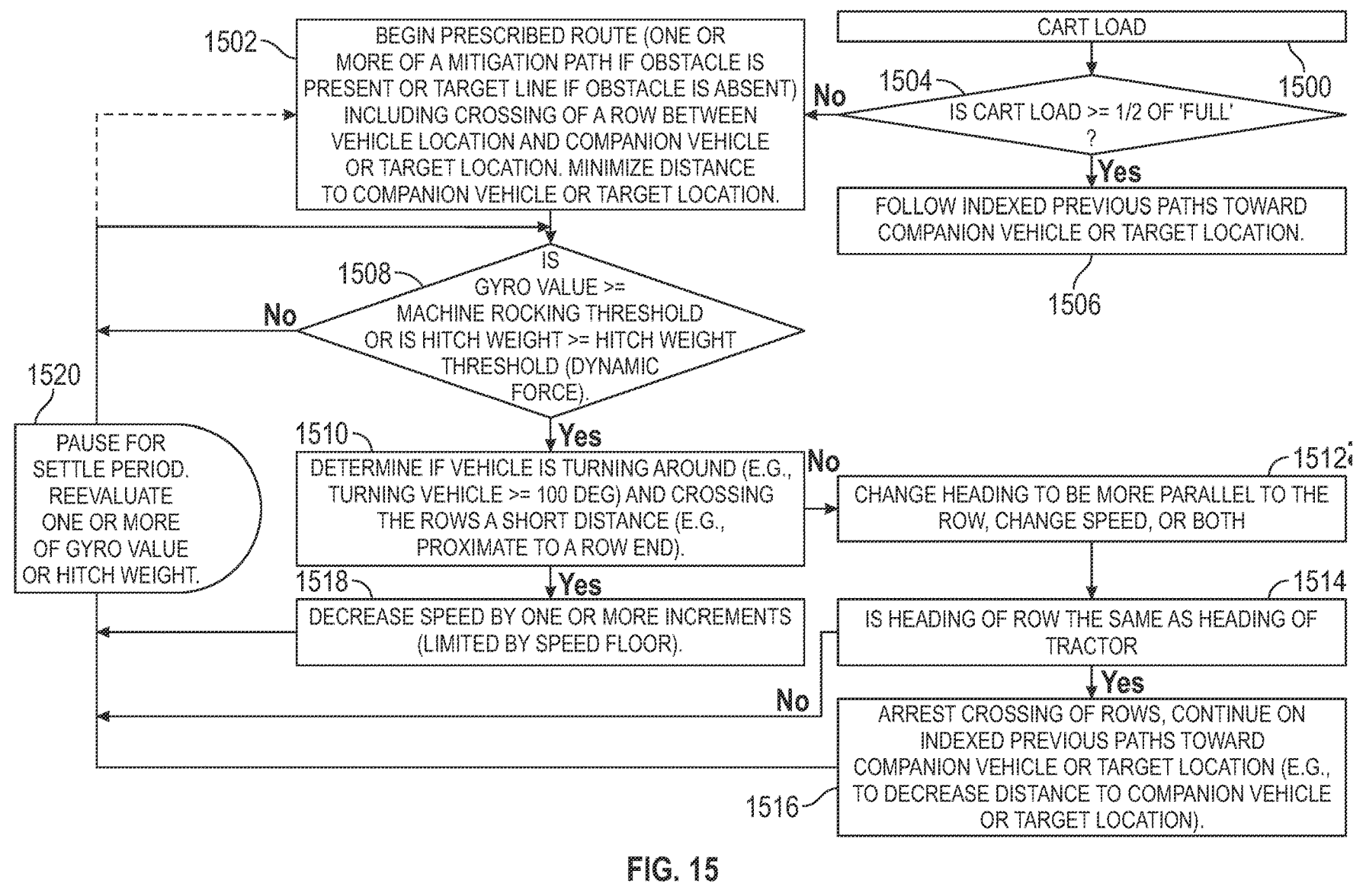

CART LOAD

1500

1504 — IS CART LOAD >= 1/2 OF 'FULL' ?

Yes → FOLLOW INDEXED PREVIOUS PATHS TOWARD COMPANION VEHICLE OR TARGET LOCATION.

1506

No ↓

1502 — BEGIN PRESCRIBED ROUTE (ONE OR MORE OF A MITIGATION PATH IF OBSTACLE IS PRESENT OR TARGET LINE IF OBSTACLE IS ABSENT) INCLUDING CROSSING OF A ROW BETWEEN VEHICLE LOCATION AND COMPANION VEHICLE OR TARGET LOCATION. MINIMIZE DISTANCE TO COMPANION VEHICLE OR TARGET LOCATION.

1508 — IS GYRO VALUE >= MACHINE ROCKING THRESHOLD OR IS HITCH WEIGHT >= HITCH WEIGHT THRESHOLD (DYNAMIC FORCE)?

No → 1520 PAUSE FOR SETTLE PERIOD. REEVALUATE ONE OR MORE OF GYRO VALUE OR HITCH WEIGHT.

Yes ↓

1510 — DETERMINE IF VEHICLE IS TURNING AROUND (E.G., TURNING VEHICLE >= 100 DEG) AND CROSSING THE ROWS A SHORT DISTANCE (E.G., PROXIMATE TO A ROW END).

No → 1512 CHANGE HEADING TO BE MORE PARALLEL TO THE ROW, CHANGE SPEED, OR BOTH

Yes ↓

1518 — DECREASE SPEED BY ONE OR MORE INCREMENTS (LIMITED BY SPEED FLOOR).

↓

1514 — IS HEADING OF ROW THE SAME AS HEADING OF TRACTOR

No

Yes → 1516 ARREST CROSSING OF ROWS, CONTINUE ON INDEXED PREVIOUS PATHS TOWARD COMPANION VEHICLE OR TARGET LOCATION (E.G., TO DECREASE DISTANCE TO COMPANION VEHICLE OR TARGET LOCATION).

FIG. 15

GUIDANCE SYSTEM TO NAVIGATE INTERVENING OBSTACLES AND METHODS FOR SAME

CLAIM OF PRIORITY AND INCORPORATION BY REFERENCE

The present application claims the benefit under 35 U.S.C. § 119(e) of U.S. Provisional Patent Application 63/208,878, filed Jun. 9, 2021, entitled "ROUTE GUIDANCE USING MACHINE-TO-MACHINE COMMUNICATION," and claims the benefit under 35 U.S.C. § 119(e) of U.S. Provisional Patent Application 63/275,373, filed Nov. 3, 2021, entitled "GUIDANCE SYSTEM TO NAVIGATE INTERVENING OBSTACLES AND METHODS FOR SAME," both of which are hereby incorporated by reference herein in their entirety.

TECHNICAL FIELD

This document pertains generally, but not by way of limitation, to autonomous vehicle operation, and more specifically, to determining a path for an agricultural machine through a field.

BACKGROUND

Modern agricultural operations generally include the use of agricultural machines (e.g., tractors, harvesters, sprayers, seeders, tillers, combines, etc.) to process fields, for instance by planting, harvesting, or generally tending to crops. In some situations, two or more agricultural machines are operated together to execute a field processing task, such as harvesting a crop, transporting a crop or cutting and bailing plants.

There is a trend towards automating the operation of agricultural machines, such as by integrating within these machines control systems that automatically perform, or that assist operators in the performance of, field processing tasks. In an example, a control system can help an agricultural machine navigate through a field along a predetermined path to plant, treat, or harvest a crop. In another example, a control system can help a first agricultural machine to automatically follow a second machine in a tandem operation to offload or process the processed output of the second agricultural machine.

SUMMARY

Agricultural fields can include dynamic and complex environments that include a number of obstacles and changing objectives, such as navigation targets, that can complicate the task of planning or calculating a route for automatic navigation of an agricultural machine (e.g., a prime mover such as a tractor, combine, sprayer, automated frame or the like; towed implement, like a cart or cultivator; or combinations of the same, such as a train of a mover and towed implements). In some examples, field maps can be populated with the locations of known obstacles and crops based on, for example, agricultural machine sensor data, operator memory, or crop planning plans. Static routes through such fields can then be precomputed and used for automated machine navigation.

The present inventors have recognized, among other things, that a problem to be solved includes dynamically determining, such as in real time, a route through an agricultural field (hereinafter, "field") from a position of a first agricultural machine to a position proximate a target location including one or more of a second agricultural machine, target end location or the like. In some examples, the position of a second agricultural machine changes or is updated during transition of the first agricultural machine along the planned route. Existing techniques for automated route planning and guidance are not well suited or applicable to the problem of planning routes guiding agricultural machines toward other moving agricultural machines. Some existing techniques include, in various examples, iterative graph theory methods such as Dijkstra's algorithm and A* (A-star) searches that require the construction of mathematical graphs having nodes and edges, where a node may represent an object or point of interest along a route and an edge may represent a connection or relationship between the objects or nodes (e.g., street intersections, atoms in a molecule, or obstacles in a maze). The route planning problem according to these techniques includes finding an optimal set of links connecting a source node to a destination node. The solutions to these problems are typically obtained by assigning a cost to each link, and iteratively walking the graph or traversing each link having a direct or indirect connection to the source node in search of the destination node. A solution set includes routes having a set of links that can be traversed to get from the source to the destination. The set of all solutions can then be analyzed, such as by comparing the total cost of each route, to obtain an optimal solution.

The described graph theory techniques represent tools that can produce potential solutions. These techniques are, in some examples, too computationally intensive for execution in a limited computing environment of an embedded navigation controller or field computer of an agricultural machine. In an example, the number of routes or possible solutions through a graph structure can increase exponentially with the number of nodes. This exponential increase in routes is associated with a commensurate increase in the amount of computer memory and processing power or time needed to iteratively explore each route to obtain an optional solution.

Graph theory techniques, in some scenarios, do not provide a sufficient cost-benefit tradeoff to justify the investment in the computational resources required to perform route planning for agricultural machines using these techniques. In an example, use of these techniques may be justified when planning a path through an environment that includes a significant number of densely placed obstacles or waypoints, and thereby results in densely or well populated graphs which may adequately exercise the computational resources that are often required to implement these techniques. Agricultural fields, however, typically include few obstacles that are usually spaced relatively far apart in comparison to city streets. Graphs constructed according to these environments are in some examples sparse, and therefore may not require the processing power typically allocated to, or demanded by, graph theory applications.

Graph theory route planning solutions require that a complete route be calculated before a vehicle or agricultural machine can move or begin navigation. In some scenarios, this may require the machine and the machine operator to sit idle while a route is planned, thus wasting operator time and machine resources. Additionally, due to the requirement that all calculations be completed before the machine is able to move, these techniques are unable to change dynamically, such as in real time, to update a planned route in response to changing conditions, such as the machine approaching a moving target, previously unknown obstacles that are detected enroute, variations in obstacles (e.g., unharvested zones that are now harvested) or the like. In an example, graph theory approaches are not sufficient to automatically update the route of a first agricultural vehicle as it approaches a moving second agricultural vehicle in real time, for instance as a grain cart and tractor approach a combine.

The present subject matter provides solutions to these problems, for instance with an autonomous agricultural machine navigation system (e.g., a device, system, method, or technique) that is configured to provide route guidance to navigate an agricultural machine through a field. In an example, the machine navigation system is used in the tandem operation of two agricultural machines, for instance to guide a first machine to a second machine while avoiding obstacles in a field. The first machine is guided to the second machine, while avoiding obstacles in the field, based on real time or near real time data that is indicative of the position of the second machine. In an example, the agricultural machine described herein includes one or more computing modules, such as a field computer, an electronic communication device, such a wireless data transceiver, and a location determining module, such as a global positioning module.

The system includes a memory having data that is indicative of one or more boundaries enclosing obstacles in the field. In an example, a boundary includes a region having a shape or contour approximating one or more obstacles therein. In another example, the boundary has a shape of an enclosed obstacle. The boundary is expanded or dilated with respect to the obstacle to define an exclusion zone or mitigation region around the obstacle. In an example, the edge or area of the boundary is expanded relative to the obstacle such that the agricultural machine traverses a path or route along the contour of the boundary without intersecting or impacting an obstacle enclosed by the boundary. In an example, data that is indicative of the boundary of one or more obstacles in the field is precomputed or computed offline and stored in the memory. In another example, data that is indicative of the boundary of one or more obstacles in the field is updated or computed dynamically (e.g., during operation of the agricultural machine) based on sensor data or other data. For instance, an unharvested zone of the field, an obstacle, is transitioned to a harvested zone (not an obstacle) to permit guidance through the now harvested zone.

The system includes a guidance module in communication with the field computer, electronic communication device, or the location determining device. The guidance module is configured to obtain a route or path (hereinafter, "path" or "travel path") from a position of the agricultural machine (e.g., a location of the agricultural machine in a field, the coordinates of the machine in a field map, or pixel location of the machine in an image of the field) to a target position in a field. In an example, the target position includes a position of another agricultural machine (hereinafter, "target machine"), such as a combine or hay rake. In an example, the target position includes a location of the target machine in a field, the coordinates of the target machine in a field map, pixel location of the target machine in an image of the field and dynamic versions of the same (e.g., corresponding to the moving target machine).

In an example, the position of the agricultural machine is determined using a location determining module. In another example, the position of the target machine is determined directly through wireless communication with the target machine, or indirectly through communication with another machine or remote computing system.

In an example, the travel path is a route, or a portion or segment of a route through a field that is traversable by the agricultural machine. In an example, the travel path includes data, such as map or geographic data, that is indicative of the planned route, or a portion or segment of the planned route. In an example, the map data includes map coordinates of one or more points on a map of the field. In another example, the map data includes pixel coordinates of one or more pixels of an image of the field. In another example, the map includes data that is indicative of one or more obstacle boundaries. In yet another example, the map data is indicative of a region enclosing one or more obstacles.

In an example, the guidance module is configured to determine the travel path iteratively, such as by calculating a first path segment along the travel path according to the techniques described herein, followed by calculating a second path segment along the travel path. In some examples, the guidance module can provide the first path segment to a navigation or control module to navigate the agricultural machine before calculating the second segment. In another example, the guidance module can calculate a complete path from the position of the agricultural machine to the target position before providing the travel path to the navigation or control module.

The guidance module includes a perception module that is configured to determine a target line from the position of the agricultural machine to the target position. In an example, the target line includes a line or path indicative the shortest distance from a first position, such as the position of the agricultural machine, to a second position, such as the target position. A target line, in various examples, include visual line of sight path from the first point to the second point, a straight light path, such as drawn on a map between two points, a direction line between a vehicle and a target position, or the like. In another example a target line is a path or line between a first position and a second position that traverses, does not consider the presence of intervening obstacles, such as hills, water features, or the like. In an example, the perception module determines the target line analytically, graphically, or electronically, such as by calculating or obtaining a line segment that connects the agricultural machine position to the target position. In an example, the perception module includes a sensor, such as an optical, laser, lidar, or radio position sensor for obtaining the position of the agricultural machine or the position of the target machine. In another example, the perception module obtains the position of the agricultural machine or the position of the target machine from the guidance module or navigation.

The guidance module includes an obstacle detection module that is configured to detect a at least one obstacle disposed in the target line between the agricultural machine position and the target position. In an example, the obstacle detection module determines the nearest intersection between an obstacle, or a boundary of an obstacle, in the field and a line segment including the position of the agricultural machine and target position. If the guidance module detects an intersection, the boundary associated with the obstacle is identified as an active exclusion zone.

The guidance module includes a mitigation module that is configured to obtain a mitigation path around the active exclusion zone based on the intersecting boundary and the target line from the position of the agricultural machine to the target position. In an example, first and second intersection points are determined. The first intersection point is an intersection point closest to the agricultural machine. The first and second intersection points correspond to potential respective starting and ending positions or points of the mitigation path around the active exclusion zone. In an example, the mitigation path is one or more segments that trace, or extend along or proximate to, or along a contour of the active exclusion zone (e.g., the boundary of the intersecting obstacle). In an example, the mitigation path is the shortest one or more segments that trace, or extends proximate to a contour of the active exclusion zone.

The mitigation module includes an entrance module that is configured to determine the starting position of the mitigation path based on a target line from the position of the agricultural machine to the active exclusion zone. In an example, determining the starting position includes determining a line segment (e.g., a scan line) connecting the position of the agricultural machine to the active exclusion zone or mitigation path. In an example, determining the starting position includes generating a set of one or more scan line segments that extend from the position of the agricultural machine to the active exclusion zone (e.g., points or positions on the boundary of the active exclusion zone). In an example, the set of line segments are generated by sequentially scanning or generating a sequence of scan lines that extend from the position of the agricultural vehicle to positions on the active exclusion zone in lateral directions (e.g., toward ends of the boundary). In an example, the last scan line in the sequence of scan lines to intersect the active exclusion zone is selected to determine the initial segment of the mitigation path. In an example, the starting position is the point at which the selected scan line (e.g., the last scan line in the sequence of scan lines to intersect the active exclusion zone) intersects the exclusion zone.

In some examples, a transition, such as a smooth or curved segment is generated, such as by the guidance module or transition module, that connects the agricultural machine position to contour segments of the mitigation path.

The mitigation module includes an exit module that is configured to determine an ending position of the contour segment of the mitigation path based on a target line from the second intersect point to the target position. In an example, determining the ending position includes determining a line segment connecting the boundary of the active exclusion zone to the target position. In an example, determining the ending position includes generating a set of one or more scan line segments that connect a position or a point on the boundary of the active exclusion zone to the target position. In an example, the set of scan line segments are generated by sequentially scanning in a leftward or rightward direction to generate a sequence of scan lines that extend between one or more positions on the boundary of the active exclusion zone (e.g., a virtual position of the agricultural machine) to the target position. In an example, the first scan line segment in the sequence of scan line segments that does not intersect the at any points between the end points of the scan line segment is selected to determine the ending position of the mitigation path. In an example, the ending position of the mitigation path is the exiting position of the last contour mitigation path segment as defined by the intersection the active exclusion zone and the first scan line segment in the sequence of scan line segments that does not intersect the at any points between the end points of the scan line segment is selected to determine the ending position of the mitigation path. In another example, the ending position of the mitigation path is the end of a segment (e.g., a curved segment) that connects the ending position of the last contour mitigation path segment to a position proximate the target position.

Optionally, the navigation system includes a mitigation path refinement module in communication with the mitigation module. The mitigation path refinement module edits a target path including the mitigation path (referred to in some places as a base or initial mitigation path) discussed herein to minimize dynamic loading of the agricultural machine that may otherwise cause damage to the machine while at the same time facilitating travel over the uneven terrain of a field toward a target position.

Dynamic loads are applied to the agricultural machine while traversing uneven terrain such as furrows along crop rows and intervening troughs between the crop rows. As the agricultural machine conducts a travel path including the mitigation path (e.g., the component segments discussed herein) the machine ground engaging elements traverse the uneven and sometimes rough terrain. The engagement with the furrows and troughs at different angles and speeds, mounting of the furrows, descending from furrows, and staggering these movements across each of the ground engaging elements causes oscillation and vibration (collectively referred to as rocking) of the agricultural machine that is amplified in agricultural implements extending from the machine, such as booms, harvester heads and in implements such as carts. Implements that are loaded or partially loaded experience enhanced dynamic forces when oscillated or vibrated because the weight of machine, implement and the load carried by the machine contribute to dynamic forces. In some circumstances dynamic loading of the machine (including implements) may cause damage to the machine including, but not limited to, damage to structural components through deformation or failure, damage to sensitive components (e.g., electronics, fittings, rods, cables or the like) or the like.

While conducting the travel path to the target position (e.g., another machine or location in the field) one or more vehicle parameters are measured with vehicle parameter sensors that measured vehicle parameters indicative of dynamic loading including, but not limited to, oscillation, vibration, moment, force, inertia, acceleration, rotational acceleration or the like of one or more of the vehicle, implement, combinations of the same or the like (referred to herein as the agricultural machine). In an example, the vehicle parameter sensor of the agricultural machine includes a gyro, inertial measurement unit (IMU) or a hitch load sensor configured to measure forces applied to the hitch of the agricultural machine (e.g., form a connected implement such as a grain cart). The sensors are in some examples, located on one or more multiple machines of the agricultural machine. For instance, a first sensor, such as a vibration sensor is coupled with a prime mover including, but not limited to, a tractor, sprayer, combine, automated drive frame or the like with or without an onboard implement. In another example, a second sensor, such as one or more load cells that determine the load (e.g., weight, volume or the like) of crops in a grain cart are coupled with the grain cart. In still other examples, the one or more sensors are consolidated in a single machine or optionally distributed between machines such as a prime mover, and one or more towed implements.

The measured vehicle parameters are compared with associated parameter thresholds. Upon meeting or exceeding one or more of the thresholds the mitigation path refinement module having a mitigation path editor initiates editing of the target path (e.g., the base mitigation path from the machine to the target position) that minimizes dynamic loading of the agricultural machine while continuing travel toward the target position. The mitigation path editor edits the base mitigation path to include one or more refined mitigation segments. In one example, the refined mitigation segment includes deviation from the base mitigation path to decrease the crop crossing angle of the ground engaging elements relative to the crop row. For instance, a transverse angle of the base mitigation path relative to proximate crop rows is (for the mitigation path segment) decreased to ease traversal of the agricultural machine across the field (e.g., furrow and troughs of crop rows). In another example, the refined mitigation segment includes a moderated (decreased) speed relative to a previous agricultural machine speed to ease traversal of the field. In still another example, the refined mitigation segment includes deviation from the base mitigation path to follow the indexed path of an agricultural machine that previously conducted operations in the field, for instance that created the crop rows (a planter), enhanced undulation of the terrain (a cultivator) or traveled along the crop rows in a manner that minimized crossing of the rows (a sprayer or cultivator). This example refined mitigation segment is based on the previously indexed path. For instance, the refined mitigation segment begins at the preceding portion of the base mitigation path and extends between crop rows and in an orientation based on the previously indexed path (e.g., aligned, substantially aligned or the like). Optionally, one or more of these modifications are combined (e.g., decreased speed with decreased crop crossing angle), for instance based on the graduation of the difference between the measured vehicle parameters and associated parameter thresholds.

In another example, the mitigation path refinement module includes a selection module, and the selection module determines the type (or types) of refined mitigation segment to edit into the base mitigation path with the mitigation path editor. The selection module optionally determines the type of segment for editing based on one or more vehicle parameters, for instance determined with the vehicle parameter sensors described in the present application. In an example, upon detection of the vehicle conducting a significant turn (e.g., conducting a turn of 100 degrees or more out of a row, to a next row or the like) in combination with detection of a vehicle parameter meeting or exceeding the parameter threshold the selection module implements editing with a moderated speed segment having a lower speed as the refined mitigation segment. Optionally, the mitigation path refinement module continues to edit in moderated speed segments with lower speeds until the one or more vehicle parameters are below the associated thresholds (or a speed floor or minimum speed is reached).

In another example, upon detection of the vehicle conducting a moderate turn (e.g., a turn of less than 100 degrees) in combination with meeting or exceeding the parameter threshold the selection module implements editing with a crossing angle segment having a decreased crop crossing angle (e.g., more closely oriented to proximate crop rows) in comparison to the present or preceding base mitigation path segment as the refined mitigation segment. Optionally, the mitigation path refinement module continues to edit in crossing angle segments with decreased crossing angles until the one or more vehicle parameters are below the associated thresholds or the agricultural machine (e.g., its ground engaging elements) are parallel to the crop row. The selection module then selects the indexed previous path as the refined mitigation segment and the agricultural machine is guided by the navigation system along the indexed previous path, for instance between crop rows proximate to a previous indexed travel of another agricultural machine.

In still another example, if neither of the moderated speed or crop crossing angle segments (including optional graduated refinement of those segments) facilitate decreases of the vehicle parameters below the parameter thresholds the selection module selects the indexed previous path as the refined mitigation segment. Optionally, if a vehicle parameter is above a ceiling parameter threshold, such as weight, load, capacity or the like (e.g., half load by weight) the mitigation path editor proceeds with editing the indexed previous path into the base mitigation path, and accordingly the agricultural machine is guided and drives along the indexed previous path, for instance with the ground engaging elements guided between crop rows.

In any of these editing permutations the mitigation path editor includes a selected refined mitigation segment with the base mitigation path, and the edited mitigation path is implemented, for instance with a steering interface coupled with the steering system of the agricultural machine. The refined mitigation segments minimize dynamic forces otherwise incident on the agricultural machine by following the base mitigation path without editing.

Optionally, the mitigation path refinement module and the mitigation path editor continue with editing of the target path including the base mitigation path until one or more return conditions are determined that prompt a return to the base mitigation path that extends from the end of the refined mitigation segment toward the target position as described herein (e.g., with straight line segments, contour segments, start and exiting positions, transition segments or the like). In one example, the mitigation path refinement module arrests editing of the base mitigation path upon sensing one or more vehicle parameters below the associated parameter thresholds. In another example, the mitigation path refinement module includes a 'settle period' and module continues editing of the base mitigation path with the refined mitigation segments until at least the settle period has expired, and then the module determines if the one or more vehicle parameters are below the associated parameter thresholds. If the vehicle parameters are not below the thresholds the mitigation path refinement module continues to edit the base mitigation path with refined mitigation segments. Upon satisfying the return conditions the navigation system redetermines the base mitigation path from the end (including an estimated end) of the refined mitigation segment toward the target position.

In an example, the mitigation path and optionally refined mitigation segments where warranted are provided to the guidance module or appended to the travel path.

In an example, the mitigation module iteratively repeats the previously described operations to calculate a second mitigation path using an ending position of a previously computed mitigation path as the new position of the agricultural machine.

In an example, the operations of mitigation module are repeated to obtain one or more mitigation paths until an intercept path is obtained. In an example, repeating the operations of the mitigation module includes using the ending position of a previous mitigation path as a position of the agricultural machine for calculating a new or subsequent mitigation path.

In an example an intercept path is obtained, such as by the guidance module or an intercept module, to obtain an intercept path that extends from the ending position of the mitigation path to the target position. Obtaining the intercept path includes determining that there are no more intersections between the position of the agricultural machine and boundaries of any obstacle in the field, determining that there is an unobstructed line of sight view to the target position from the machine, obtaining a target line from the ending position of the mitigation path to an intercept point proximate the target point, and obtaining a curved path from the intercept point to the target point.

In some examples, the guidance module includes a convergence module that combines the determined mitigation paths, the transition paths, and the intercept path to form the travel path. Such combining can include prepending the transition paths to corresponding mitigation paths, and concatenating adjacent mitigation paths. Such combining an also include appending the intercept path to a mitigation path.

In an example, the autonomous agricultural machine navigation system described herein improves on existing navigations systems by providing a low complexity solution for agricultural machine route guidance based on machine to machine communication. In another example, the autonomous agricultural machine navigation system described herein improves on existing navigations systems by providing a low complexity solution for agricultural machine route guidance to guide a machine to a target position (e.g., a stationary or predetermined position, updated position, dynamic or changing position in a field or the like) in an environment having one or more obstacles. In contrast to other systems, the described system dynamically generates optional or near optimal routes for guiding an autonomous agricultural machine through a field without straining the computing resources of the machine's field or navigation computer. Additionally, routes are generated iteratively so that a first portion of a determined route can be provided to navigate the agricultural machine before a second portion of the route is determined. Furthermore, unlike other systems, the disclosed system enables computationally efficient dynamic route updates responsive to changes in the environment, such as a change to an obstacle or a relocation of a target position.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a schematic view of an autonomous agricultural machine navigation system implementing an example algorithm for generating a mitigation path.

FIG. 14 is a schematic view of one example a guidance module and mitigation path refinement module.

FIG. 15 is a schematic view of a mitigation path refinement module implementing an example algorithm for refinement of a mitigation path.

DETAILED DESCRIPTION

Computer vision systems use cameras and other sensors to collect spatial information about environments, such as a fields where agricultural machines operation to cultivate crops.

Figure 1:
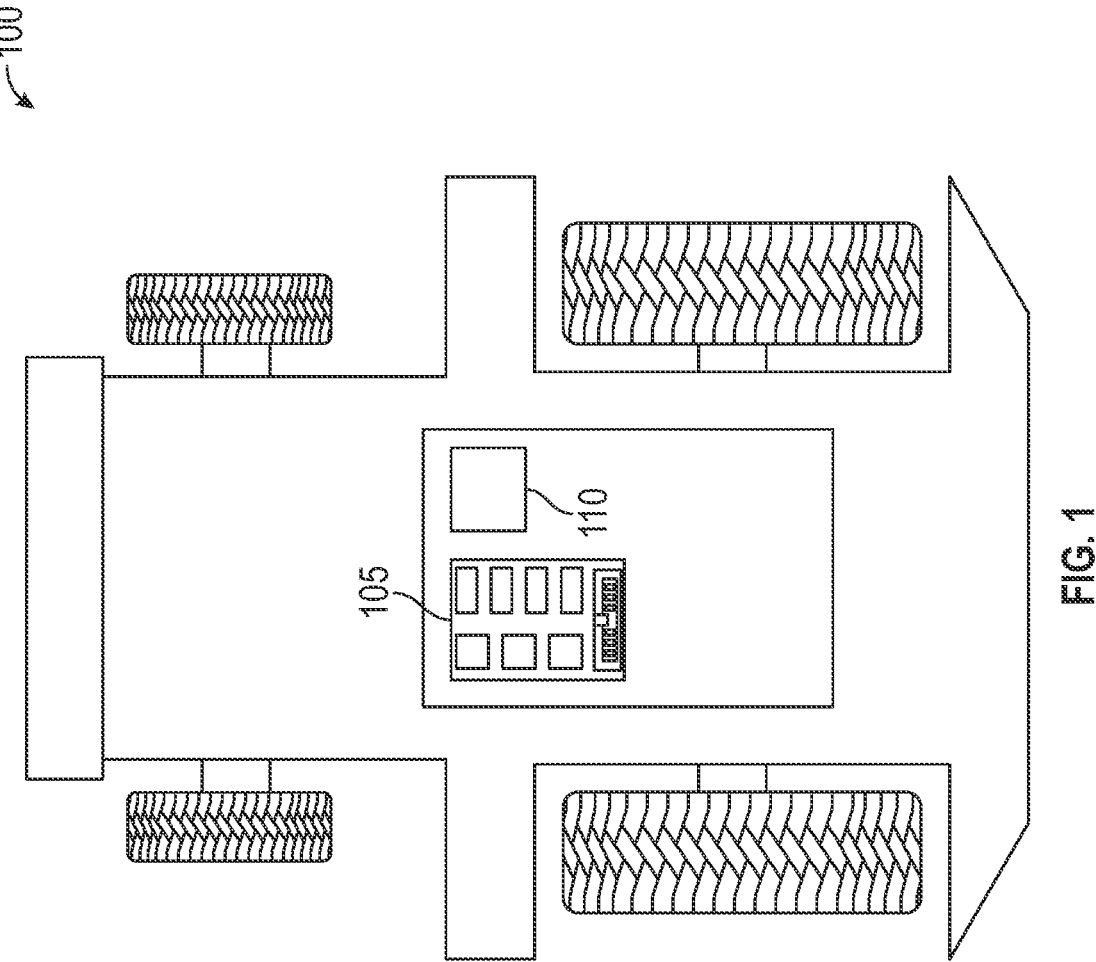
FIG. 1 is a schematic view of one example of a machine.

FIG. 1 illustrates an example of a machine 100 that is configured to implement the techniques described herein. The machine 100 includes, in various examples, any agricultural machine that is provided to perform a task such as processing a field by applying a product, such as a mixture of agricultural products, to the field or other land region. In an example, the machine 100 is an agricultural sprayer that is configured to distribute agricultural products to crops. In some examples, the machine 100 includes a machine controller 105, and a sensors 110. The machine controller 105 includes, in various examples, one or more hardware circuits or software applications that are configured to control the operation of the machine 110, such as by generating a guidance vector and automatically steering the machine according to the guidance vector and input received from one or more of the sensors 110. The sensors 110 include, in various examples, any of the position, orientation, behavioral, or other sensors described herein. Optionally, the sensors 110 include vehicle parameter sensors as described herein (e.g., to monitor one or more vehicle parameters including, but not limited to, dynamic loads, orientation, oscillation, vibration, moments, inertia, forces or the like).

Figure 2:
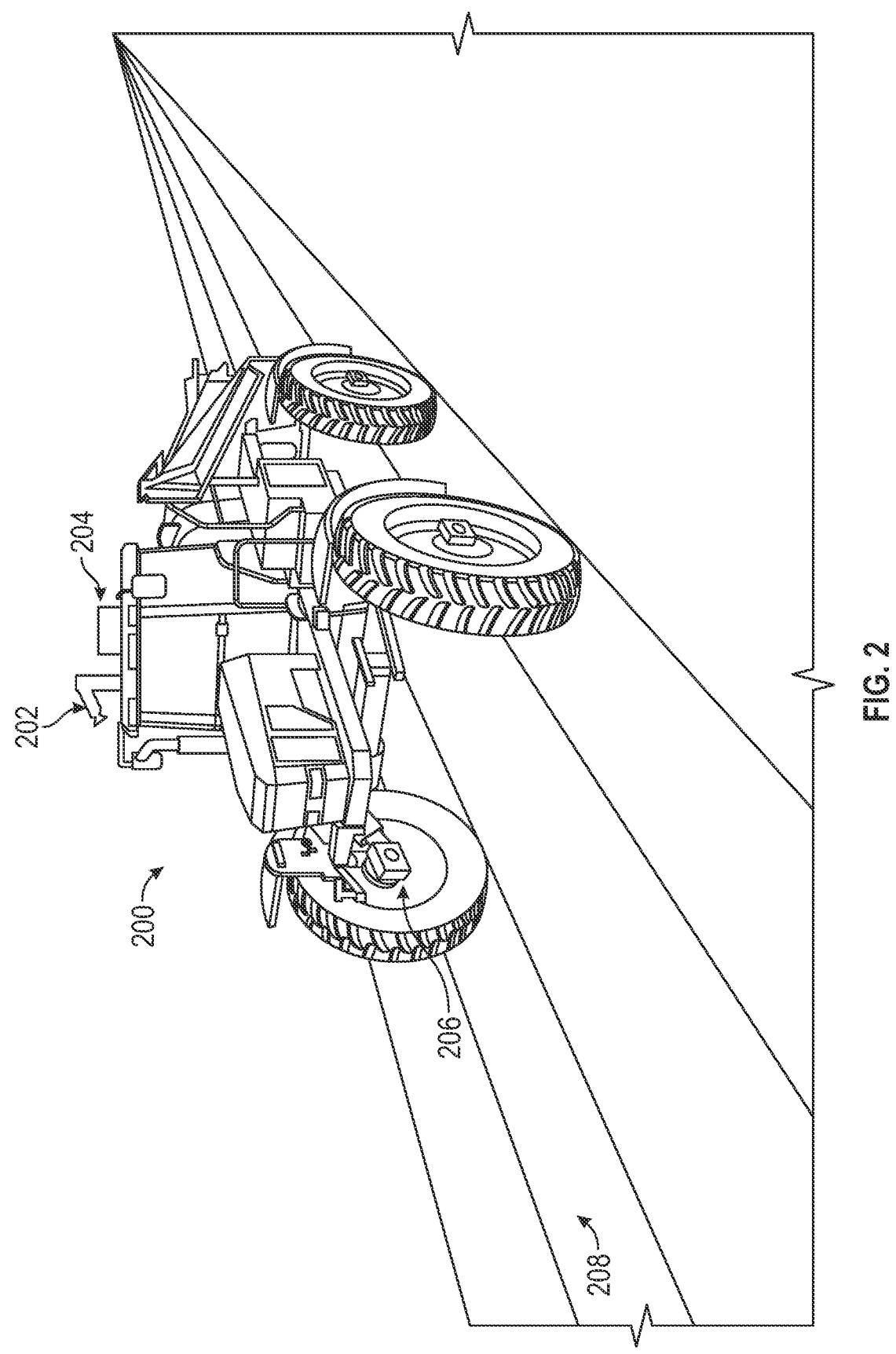
FIG. 2 is a perspective view of another example of a machine operating in a field.

FIG. 2 illustrates an example of an agricultural machine 200 including one or more sensors (e.g., positioning sensors, video cameras, and wireless data communication devices) that are configured to communicate with a second machine in a field 208 to automatically guide the agricultural machine 200 to the second machine. The one or more sensors may include a first one or more sensors 202 including one or more vision sensor assemblies 202 including, for example, a digital video camera and/or a LIDAR device. The first one or more sensors 202 may be mounted at an elevated position (relative to the field 208, crop canopy, or ground engagement units 206) on the machine and is configured to capture images of a field. The images are usable, such as by the machine controller, to determine cross track error or heading error, in various embodiments. The one or more sensors may also include a second one or more sensors 204 including one or more sensor assembly including, for example, a GPS antenna or receiver/transmitter or other sensor device.

FIG. 3 illustrates an example technique or method for automatically planning a route or guidance path using machine-to-machine communication. The method includes performing a field scan at step 302, and determining whether there are any intersects with field exclusion zones at step 303. If intersects are determined, a mitigation path is determined at step 304. If no intersects are determined, an intercept path is generated at step 306, a convergence path is determined at step 308, a path filter is applied at step 310, and a filed and exclusion boundary check is performed at step 312 to output whether a valid path is found. In various embodiments, step 302 may include considering a line segment defined by actual position (or virtual or projected position) P to target position T [P,T]. The step 302 may further include determining the nearest intersections of [P, T] with any exclusion zone or field boundary. If no intersections are found then the method proceeds to the creation of the 'Intercept Path'. If an intersection is found with exclusion zone X, the method proceeds to a 'Mitigation Path'. This zone is now labelled as the 'active' exclusion zone for the next steps, constructing a mitigation path around it.

Figure 6:
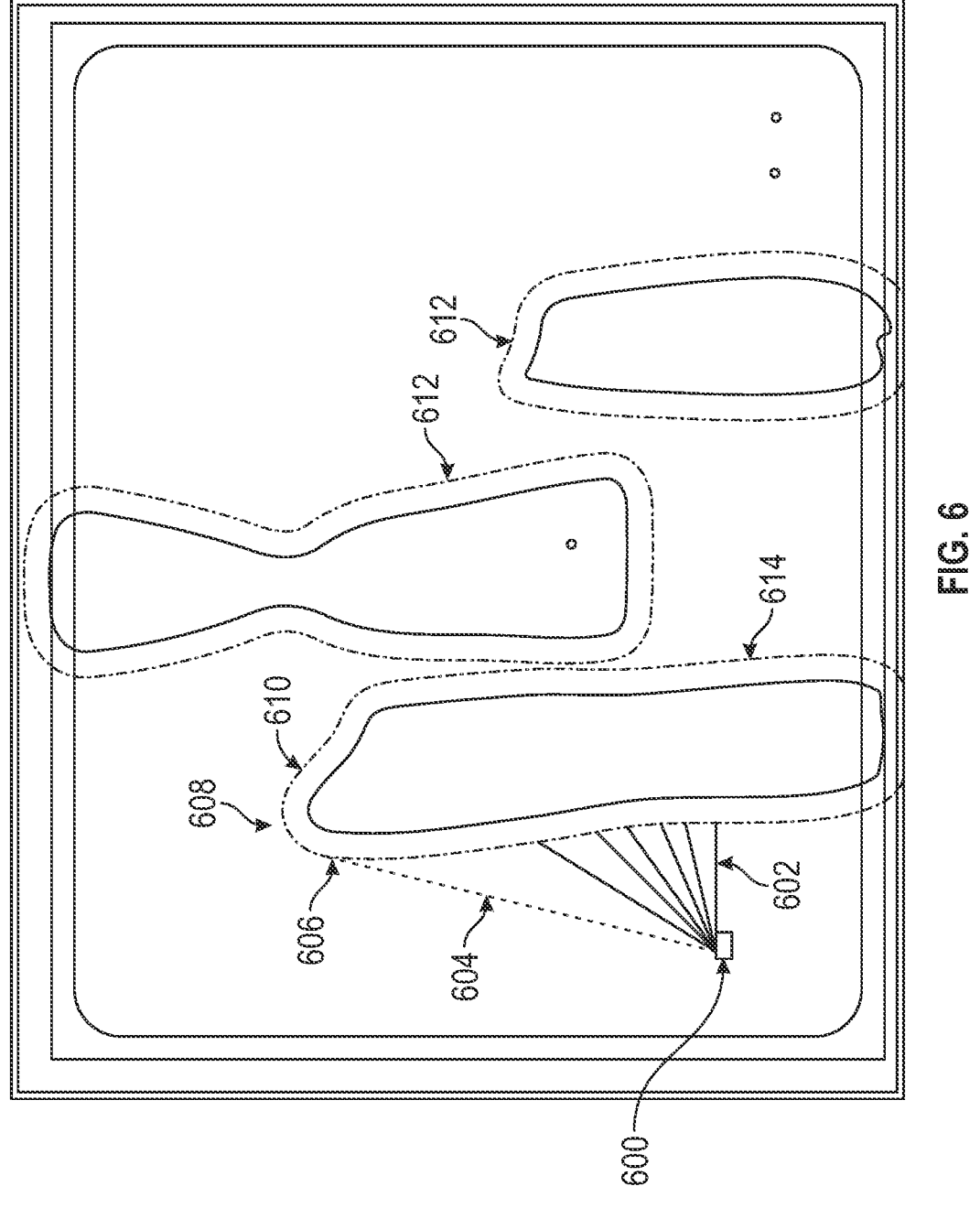
FIG. 6 is a schematic view of the example field illustrating scanning of an intervening obstacle and generation of a straight line segment of a mitigation path.

In various embodiments, step 304 may include determining a mitigation path. In an example, nearest (first) and second nearest (second) intersection points determine initial start and end points (m0 and mn) of a mitigation path around exclusion zone X, where mitigation path M=[m0, . . . , mn] is the shortest curve of left and right options to travel from m0 to mn. A graphical example of this technique is shown in FIG. 6 and other schematic figures herein. In various embodiments, path optimization is associated with entrance to M. The method may attempt to determine a shorter connection from actual position P to mitigation path M, by scanning line segments [P, mi] for field intersections, in an example. In various examples, the last point at which there are no intersections found will be the new entrance point men to M=[men, mn], to provide a smooth entrance. In some examples, the method constructs a drivable arc as an entrance to mitigation path M as a smooth transition from line segment [P, men] to M, and the path propagation to the exit of M. In various example, the method determines an optimized exit point of M by scanning line segments [mi, T] for field intersections. The first line segment that does not intersect with the active exclusion zone becomes the new exit point mex of M=[men, mex], and the exit point mex becomes the new actual position P to start a new cycle with a field scan, in various embodiments.

In various embodiments, step 306 may include generating an intercept path. In some examples, when no more intersections are found between actual position P and the field obstacles, the target is in direct view. In various examples, a path to target may be defined by a straight line segment to the intercept point and an arc from the intercept point to the final target point (a Dubins path may also be used).

In various embodiments, step 308 may include determining a convergence path. For example, the method may concatenate all mitigation paths and the intercept path, to provide a full path from start to target. In some embodiments, the first segment of that path does not necessarily align with the vehicle heading. A chicane arc (left-right combination) may be used as convergence segment as first stage of the path (a Dubins path may be used as well).

In various embodiments, step 310 may include applying a path filter. In various examples, with exclusion zone boundaries and mitigation path entrances smoothed, a precise adherence to the vehicle's maximum curvature and maximum curvature rate may not accounted for. In various examples, the path may be filtered to make sure all arcs are drivable by the machine. Filtering may include removing arcs or curves to violate specified curvature and curvature rate specifications. In addition, curves or arch may also be adjusted, such as by smoothing. Filtering may also consider user experience specifications, such as a G-force or acceleration, or a rate of turn, in various examples.

In various embodiments, step 312 may include a field and exclusion boundary check. For example, the method may check for a violation of path points to exclusion zones and a field boundary. In some examples, a violation may result in a 'No Path' found state. The method may ensure that the calculated path does not guide a machine outside of, or too close to, a specified field or obstacle boundary, in various examples.

According to various embodiments, the method may include offline field computations. In some examples, the expanded (or dilated) exclusion zone boundaries (or mitigation boundaries) are computed offline and/or loaded from storage to limit computation time. The expansions include corner smoothing for drive-ability, but may not perfectly match the vehicle's maximum curvature limitations (which is included in the path filtering operation). In various examples, the field boundary is treated similar to exclusion zones, but the mitigation boundary is eroded instead of expanded. Intersecting mitigation boundaries may be merged into a single boundary, in an example.

The present method or algorithm may run continuously to dynamically adapt to a changing environment state (or relative position between an actual position and the target, relative position to obstacles, moving target, etc.). In various examples, the same algorithm may be used to calculate the complete path, start to target, by propagating the actual position forward on the path constructed so far and reevaluating the direct connection to target from that new position, such as by using a virtual tractor traversing the path, then propagating the path forward to the target In various embodiments, the method repeats these steps until the target reached: (1) scan field for intersections between direct line to target and obstacles; (2) use expanded border of nearest obstacle as mitigation path; (3) optimize by connecting directly (or close to) the obstacle corner; (4) propagate by looking for the end point of the mitigation path; and (5) returning to step 1 or constructing an interception path if the target is in view.

Figure 4:
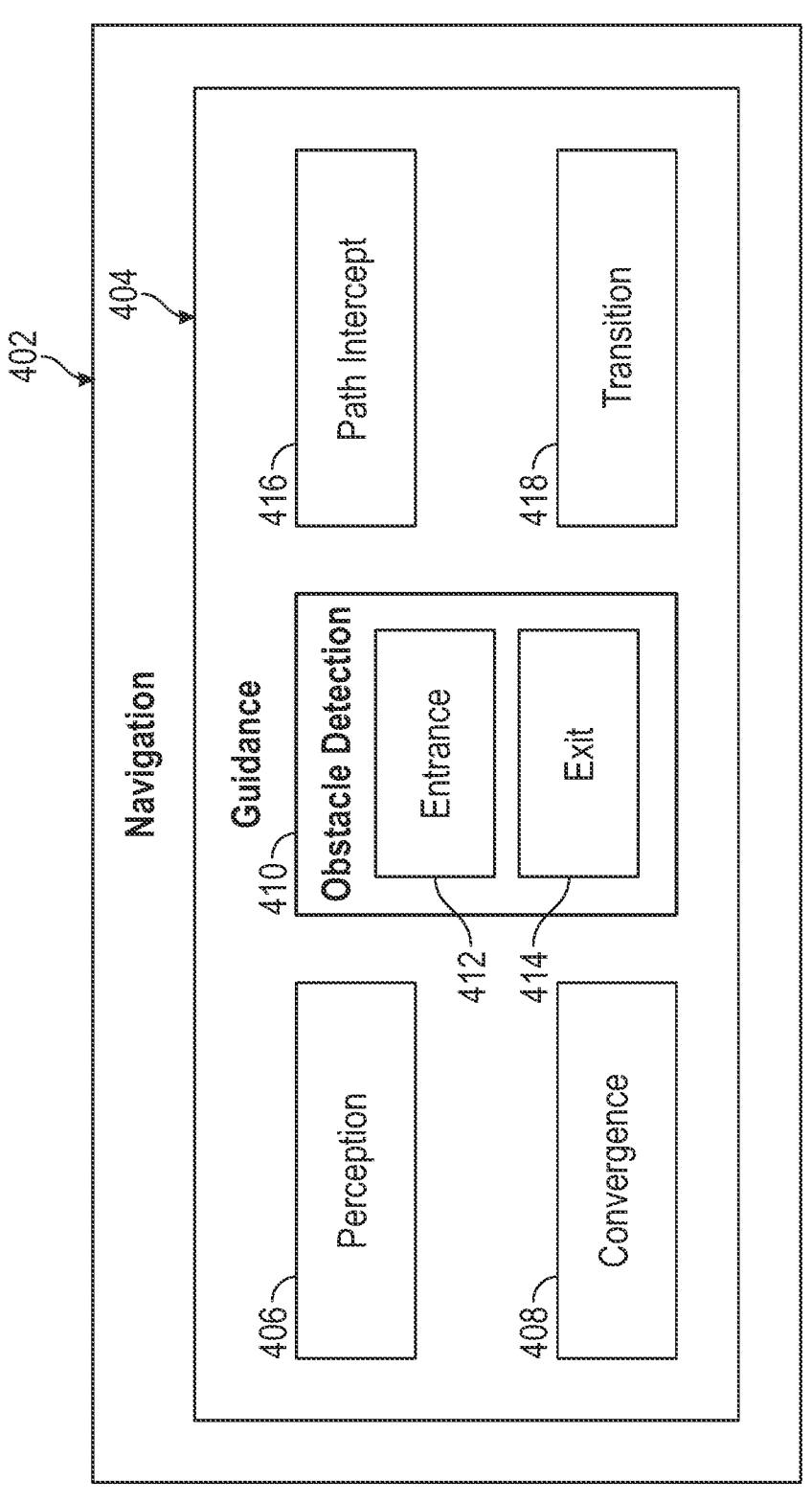
FIG. 4 is a schematic view of an example autonomous agricultural machine navigation system.

FIG. 4 illustrates components of a system for automatically planning a route or guidance path using machine-to-machine communication. In various embodiments, the system includes a navigation component 402 including a guidance component 404. The guidance component 404 may include a perception component 406, a convergence component 408, an obstacle detection component 410 including entrance component 412 and exit component 414, a path intercept component 416, and a transition component 418. In some examples, the vehicle may be navigated based on a target line or a direct line of sight to target (hereinafter, "target line") or to intermediate way points. The system may scan the field for any inner boundary intersections with the target, and construct an expanded boundary based 'mitigation' path around obstacles in view, in various examples. The system may use the shortest (lowest cost) path around each obstacle, in an example. Some benefits of the system include: relatively low computational complexity allowing for fast updates; the path may be updated continuously (at navigation control rate) to avoid obstacles; the system uses intuitive paths, with behavior similar to human operators; the system provides support for intermediate targets or way points in real time either by operator or an external field control module (e.g., first follow crop lanes before going to next target); and the system may integrate real time obstacles determined by a perception controller.

FIGS. 5-11 illustrate examples of a field maps that are graphically illustrative of the methods discuss herein to automatically plan a route or guidance path using machine-to-machine communication.

Figure 5:
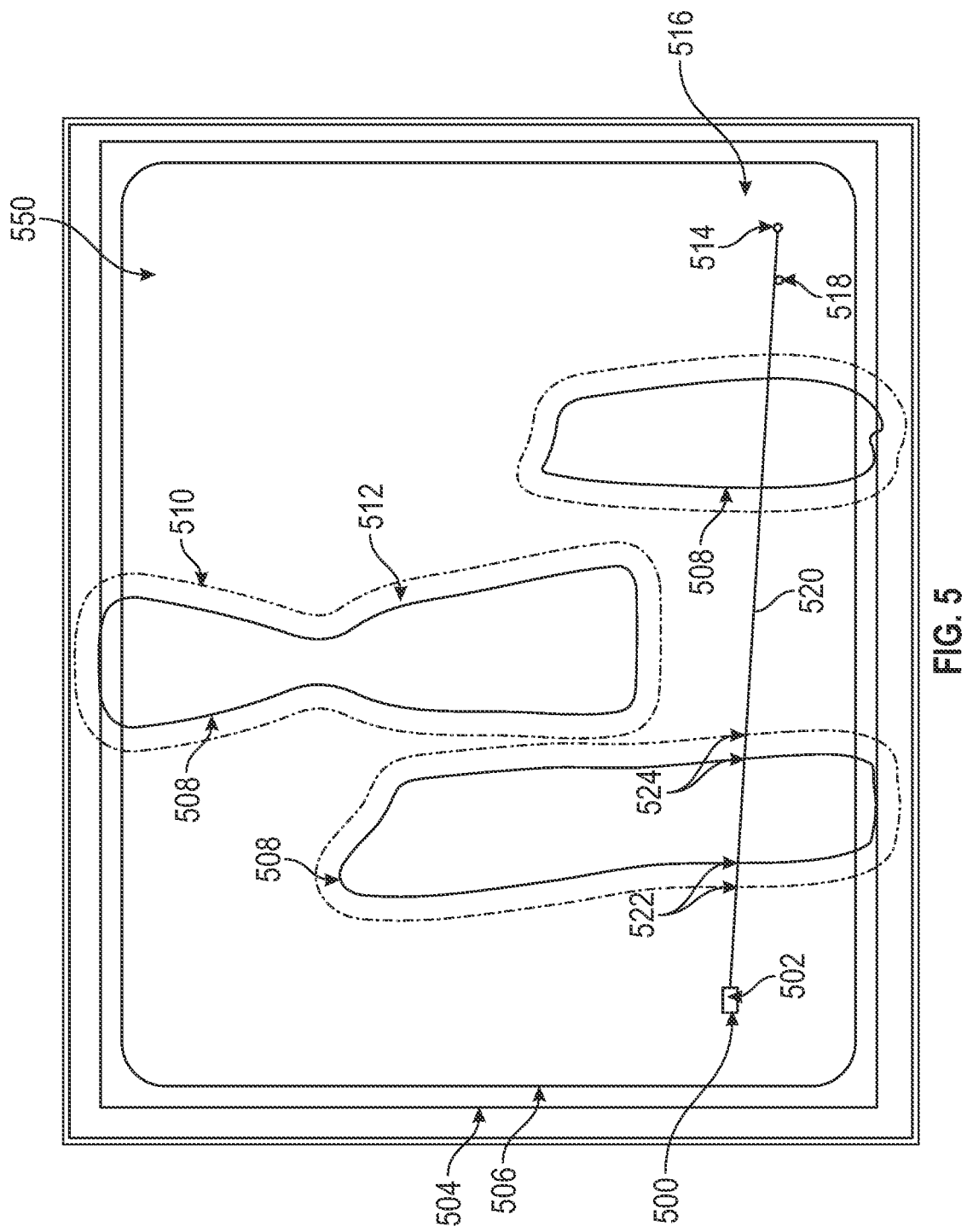
FIG. 5 is a schematic view of an example field including an agricultural machine and a target location with intervening obstacles.

FIG. 5 is a schematic view of an example field including an agricultural machine 500 and a target position 516 with intervening obstacles 508. In the depicted embodiment, the agricultural machine 500 is at a machine position 502 which may include a position of any portion of the machine in an agricultural field 550. A target line 520 or scan line segment may include a line between the machine position 502 and the target position 516 (or target point). The target position 516 may be a static position or a moving position, such as the location of a second machine traversing the agricultural field 550. The agricultural field 550 includes an agricultural field physical boundary 504 that is typically a hard boundary that the machine is not allowed to traverse. The agricultural field physical boundary may be a physical boundary or a logical or virtual boundary determined by specified rules, regulations, or machine task or function. The agricultural field 550 may further include a computationally reduced field boundary 506 that is reduced to create a buffer or exclusion zone between the physical boundary and the machine and associated implements. The computationally reduced field boundary 506 may be calculated offline or updated or adjusted responsive new sensor data, changing environment conditions, or changing task or machine job function, in various examples.

One or more obstacles 508 may include a physical obstacle, such as a rock formation, a depression, a protected area of the agricultural field 550, trees, a water element (e.g., a pond, lake or river), or the like. An obstacle boundary 510 may include an expanded or dilated boundary to serve as a mitigation path around the one or more obstacles 508. The obstacle boundary 510 may be separated from the one or more obstacles 508 by a distance 512 that may be selected to ensure that the calculated route does not cause the agricultural machine 500 (including associated implements) to intersect the one or more obstacles 508. The present system may use a sub-target point 514 to improve positioning for synchronization with the target position 516. The sub-target point 514 may be provided to a guidance module as the target point for route planning, and the guidance module may switch to using the target position 516 once the agricultural machine 550 is lined up at the sub-target point 514, in various examples. The target line 520 may intersect the one or more obstacles 508 at a first intersection point 522 and a second intersection point 524 (and so on) at corresponding points on the one or more obstacles 508. An intercept point 518 may be the start of the last arch to the target position 516, in an example. In the present example, the agricultural field 550 includes multiple exclusion zones with narrow passages and the present system accounts for field borders. Although shortest route goes south to get to the combine (or target), the agricultural machine 500 is instead directed the longer way as the short path intersects the field borders (and triggers use of the routes extending in the converse direction as shown in FIG. 6). Thus, if a potential route is directed toward a field boundary, the potential route is directed conversely to avoid exiting the field. In various embodiments, the computations for the field boundary check is processed partially or wholly offline to limit impact on real time computations.

FIG. 6 illustrates a schematic view of the example field illustrating scanning of an intervening obstacle and generation of a straight line segment of a mitigation path. An agricultural machine 600 including the present subject matter generates scan lines 602 that are scanned from right to left (relative to the machine 600) and uses a selected scan line 604 to determine entry or starting position of a mitigation path 610. A starting position of the initial contour segment 606 of the mitigation path may include the first mitigation path/segment after an initial straight line segment of the mitigation path 610. The boundary between the mitigation path 610 and the obstacle being avoided may be referred to as an active exclusion zone 608, while the boundary around other obstacles may be referred to as inactive exclusion zones 612. The mitigation path may include a potential exit position 614 from the mitigation path, in various examples.

Figure 7:
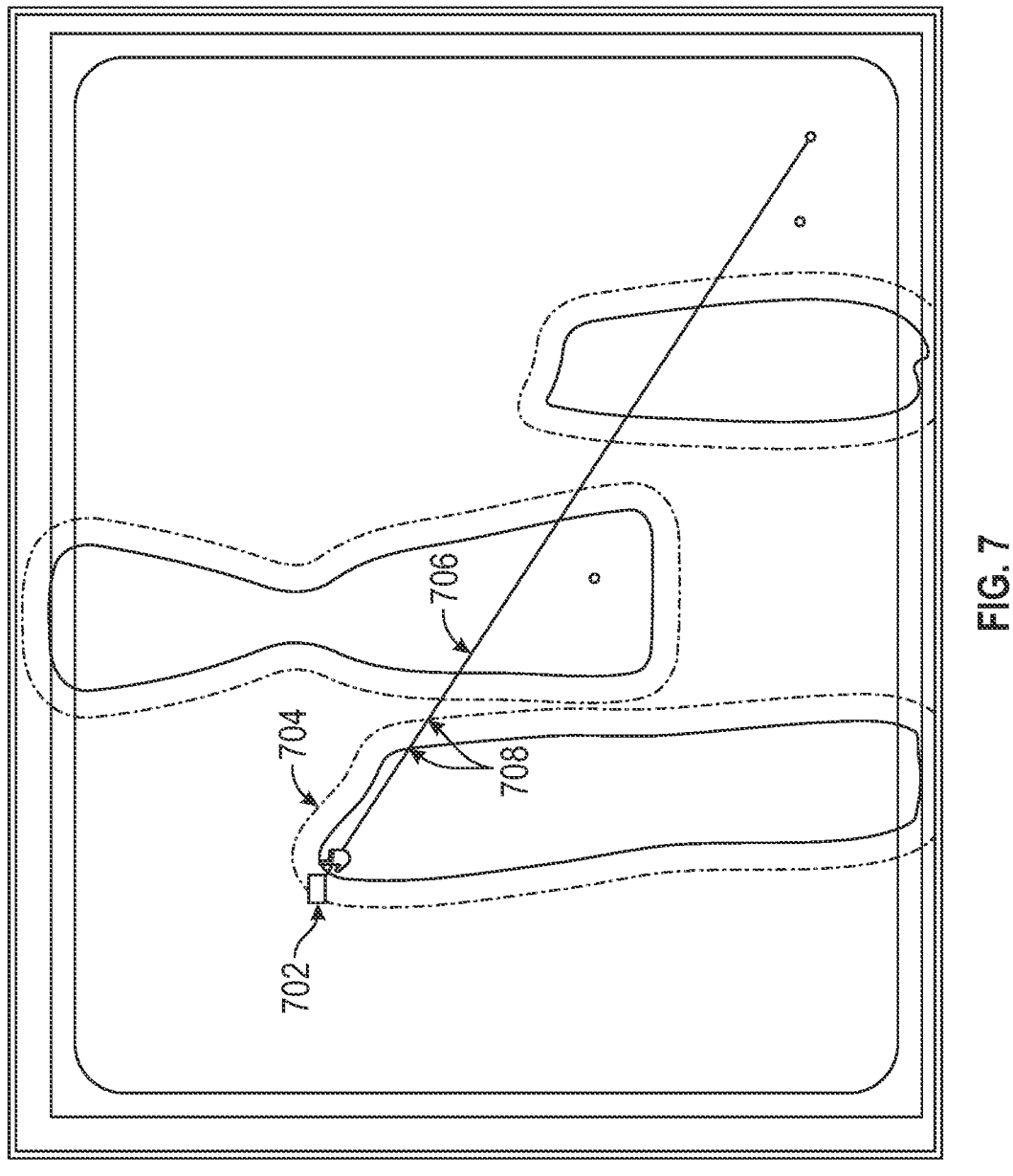
FIG. 7 is a schematic view of the example field illustrating an updated target scan line.

FIG. 7 illustrates a schematic view of the example field illustrating an updated target scan line. In various examples, an agricultural machine begins at a starting point 702 of a contour segment 704 of a mitigation path, and follows the mitigation path (e.g., the expanded boundary) around the obstacle until an exit point is obtained. In various examples, the mitigation path extends along the contour of the exclusion zone until the vehicle departs along a new or updated scan line 706. The new or updated scan line 706 (or target line) is generated from the agricultural machine to the target position (e.g., the sub-target position). In various examples, the updated scan line 706 is generated as the machine searches for an exit point from the current mitigation path segment. The updated scan line 706 is not selected to determine the exiting point because the scan line intersects the active exclusion zone (twice) at points 708 between the vehicle position and the target, in various examples. In various embodiments, the mitigation path segment will iteratively grow following the boundary of the active exclusion zone until a suitable exit point is found, such that a line segment that extends from the position or virtual position of the machine to the target does not intersect the active exclusion zone at any point between the position of the machine and the position of the target.

Figures 8A, 8B, 8C:
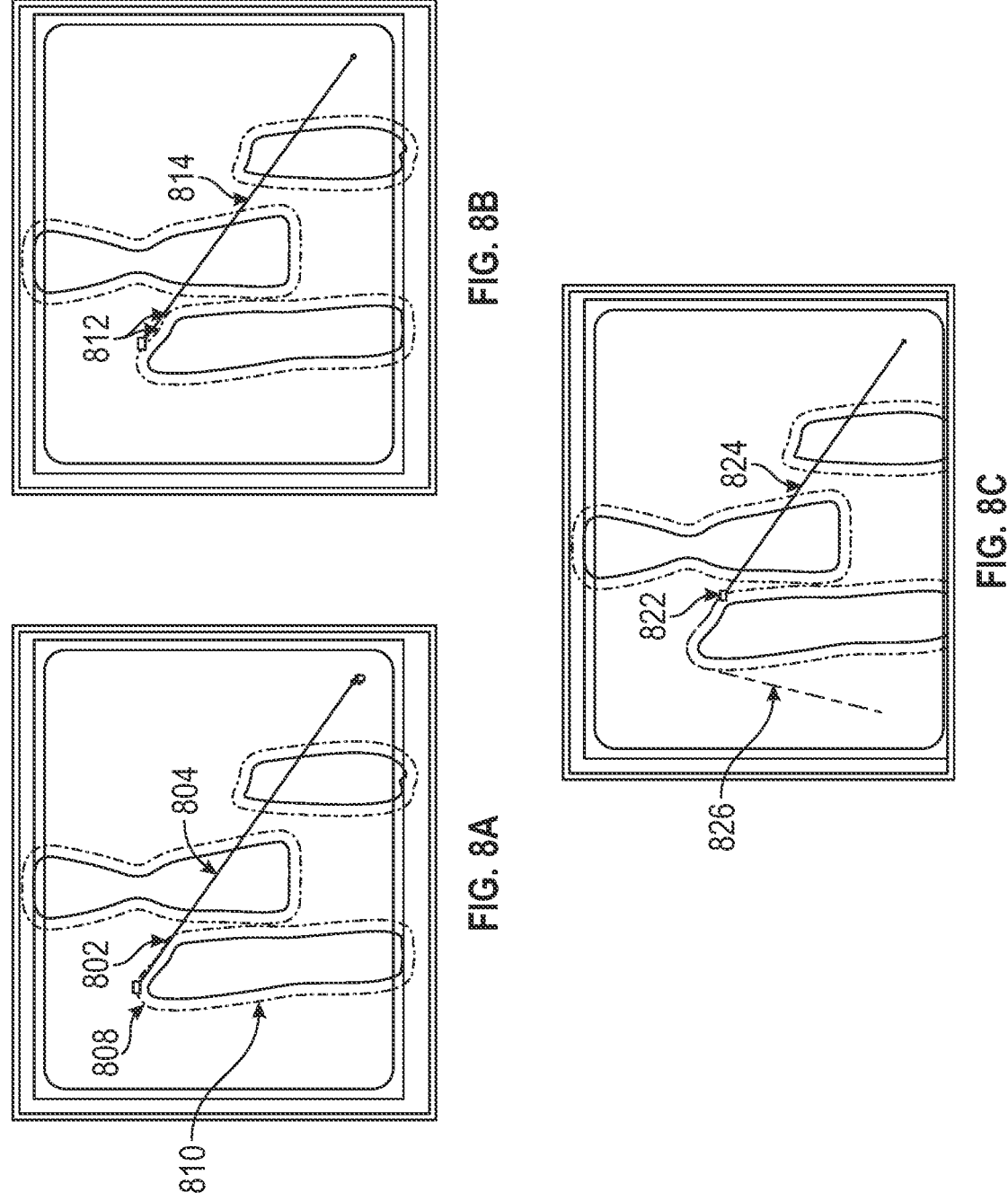
FIGS. 8A-C are sequential schematic views of the example field traversing a contour segment of the mitigation path and updating the target scan line.

FIGS. 8A-8C illustrate sequential schematic views of the example field traversing a contour segment 808 of the mitigation path and updating the target scan line. A target line or scan line 804, 814, 824 may be generated from the machine position to the target position. In FIGS. 8A and 8B, the scan line 804, 814 intersects the active exclusion zone 810 at more than one point between the end points of the segment. The intersection points 802, 812 with the active exclusion zone 810 may include either an intersection with the currently selected obstacle or the expanded boundary of the obstacle. In FIG. 8C, the scan line 824 does not intersect the active exclusion zone 810 at any point between the end points of the segment, and the end point that touches the active exclusion zone 810 is the exiting position 822 from the mitigation path 826 computed around the obstacle. The exiting position 822 is the actual or virtual position of the agricultural machine when a target line or scan line from the machine position to the target position does not intersect the active exclusion zone 810 at any point between the end points of the segment (e.g., the position of the machine and the target position).

Figure 9:
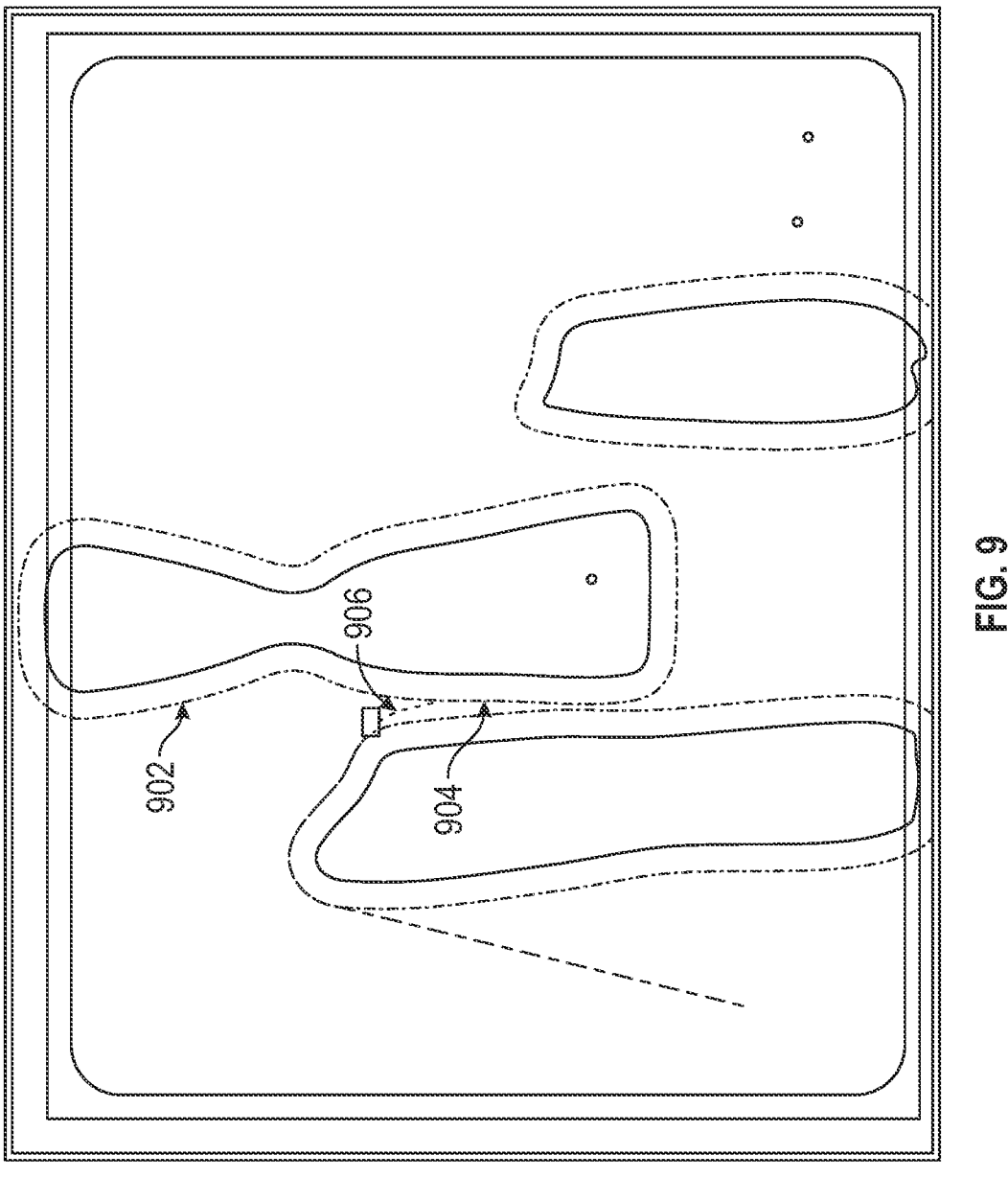
FIG. 9 is a schematic view of the example field illustrating scanning of a next intervening obstacle and generation of an interconnecting segment of the mitigation path.

FIG. 9 illustrates a schematic view of the example field illustrating scanning of a next intervening obstacle and generation of an interconnecting segment of the mitigation path. As the agricultural machine approaches the next intervening obstacle having a new active exclusion zone 902, a guidance module of the present subject matter generates a segment 906 or curved path to transition the agricultural machine to a starting point 904 of the new mitigation path for the next intervening obstacle. In various embodiments, the segment 906 may include multiple potential segments, as discussed in FIG. 6. The system may select the segment 906 from other potential segments based on a shortest length and based on kinematic characteristics of the vehicle (e.g., turning radius or the like), in various embodiments.

Figure 10:
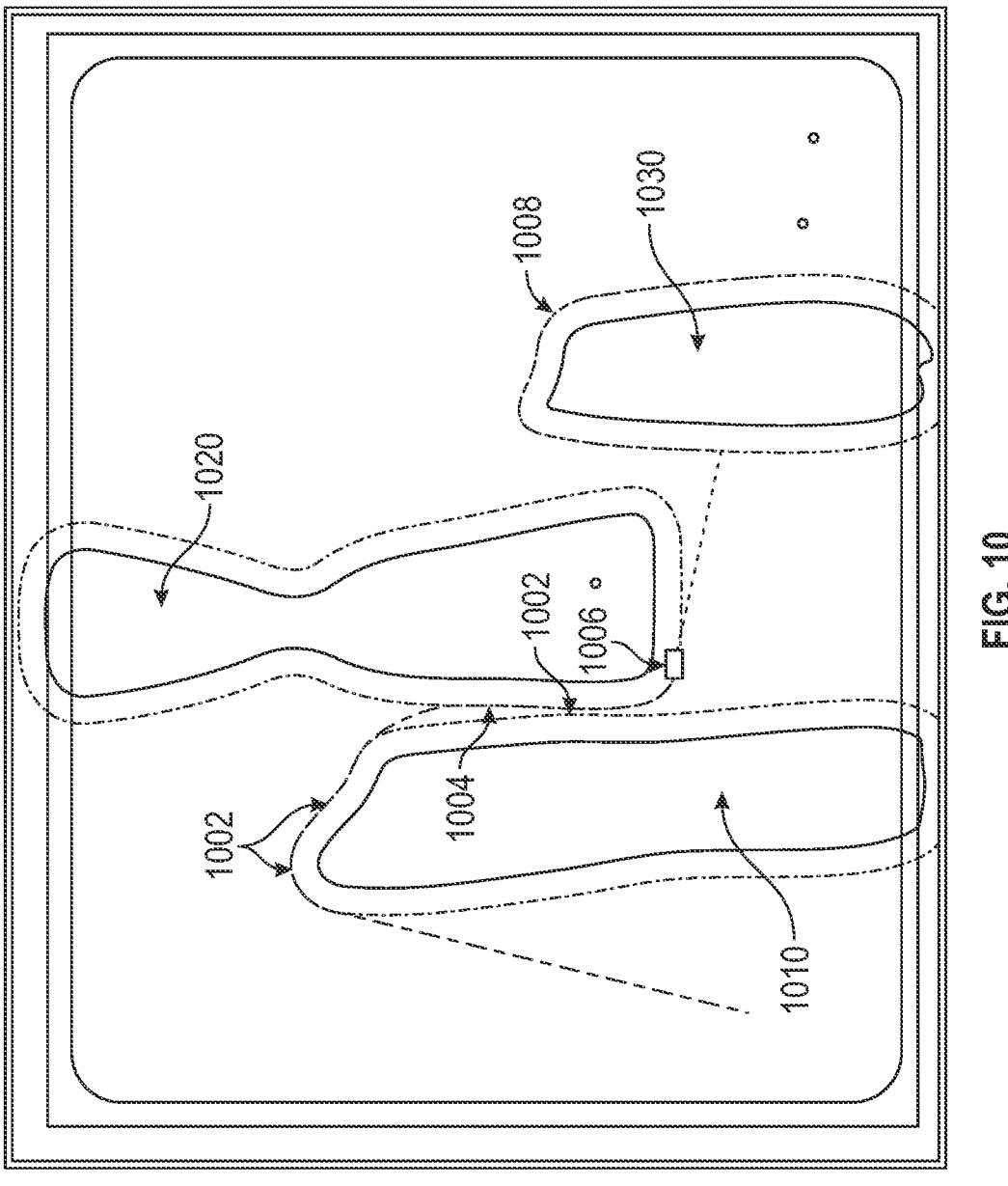
FIG. 10 is a schematic view of the example field illustrating scanning of a third intervening obstacle after guidance along another example contour segment of the mitigation path.

FIG. 10 illustrates a schematic view of the example field illustrating scanning of a third intervening obstacle 1030 after guidance along another example contour segment of the mitigation path after a first intervening obstacle 1010 and a second intervening obstacle 1020. The agricultural machine follows a combined mitigation path 1002 (partially overlaid along the boundary of the proximate obstacle) generated by the guidance module for the first two obstacles 1010, 1020 through a starting point 1004 of the next mitigation path for the second obstacle 1020, to an exiting position 1006 from the second mitigation path around the second obstacle 1020 (e.g., including an associated contour segment around the second obstacle). The agricultural machine then proceeds to transition to a third mitigation path around a third obstacle 1030 having active exclusion zone 1008. As discussed with respect to FIG. 6 above, the system may consider multiple potential segments before selecting a mitigation path, by scanning again and selecting to avoid a field boundary, in various embodiments.

Figure 11:
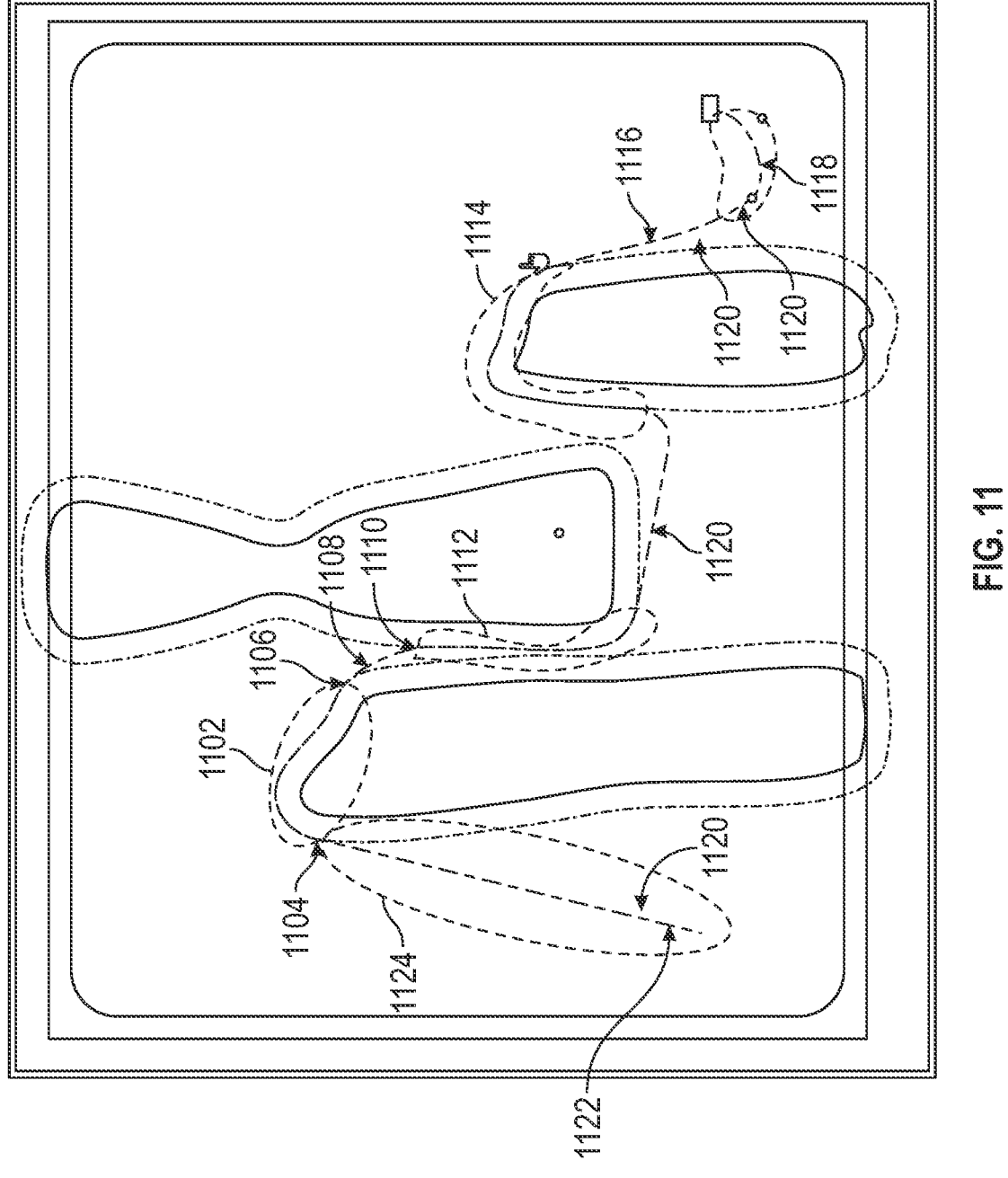
FIG. 11 is a schematic view of the example field including an overall mitigation path extending between an initial position of the agricultural vehicle to a target location.

FIG. 11 illustrates a schematic view of the example field including an overall mitigation path extending between an initial position of the agricultural vehicle to a target location. The agricultural machine begins at a starting position 1122, which may be an actual or virtual position of the agricultural machine, and follows an initial straight line segment 1124 of the mitigation path. The initial straight line segment 1124 extends from the starting position 1122 of the machine to a starting position 1104 of the initial contour segment 1102 of the mitigation path. The initial straight line segment 1124 may be a line segment denoting the shortest distance from the position of the machine to the starting position 1104 of the initial contour segment 1102, and may correspond to the shortest distance to enable the machine to navigate around the first obstacle. Optionally, the initial straight line segment 1124 includes one or more refined mitigation segments as discussed herein, for instance to ease passage of the machine over rough terrain (e.g., harvested crop rows).

The initial contour segment 1102 of the mitigation path may include the first mitigation path segment after the initial straight line segment 1124. The initial contour segment 1102 traces a contour of the active exclusion zone of the first obstacle up to an exit point or exiting position 1106 of the initial contour segment 1102 of the mitigation path. A departure or transition segment 1108 of the mitigation path may connect the exiting position 1106 of the initial contour mitigation path segment 1102 to the starting position 1110 of the next (or second) contour segment 1112 of the mitigation path. The transition segment 1108 may be a curved path to create a smooth transition between segments, in various examples.

The agricultural machine travels along the calculated travel route 1120 and may proceed to a third contour segment 1114 of the mitigation path, and then to a third departure or transition segment 1116 of the mitigation path including a straight line portion of an intercept path that connects the exiting position of the last mitigation path to an intercept point. An arc or curved portion 1118 of the intercept path may provide a smooth transition from the intercept point to the target position. The curved portion 1118 provides an interface for the agricultural machine (or approach vehicle) to move alongside a second machine (or target vehicle), e.g., in an adjacent swath, instead of directly approaching the target vehicle. In one example, the target vehicle is a combine and the approach vehicle is a tractor towing a grain cart that may approach the combine in a side-by-side manner to ensure that the grain cart is positioned proximate to the combine auger to offload crops from the combine to the cart.

The calculated travel route 1120 of the agricultural machine may be precalculated without physically moving the agricultural machine by using a virtual machine that projects the position of the agricultural machine along the mitigation path and using the projected position as the actual position of the machine during calculations, in various embodiments.

Figure 13:
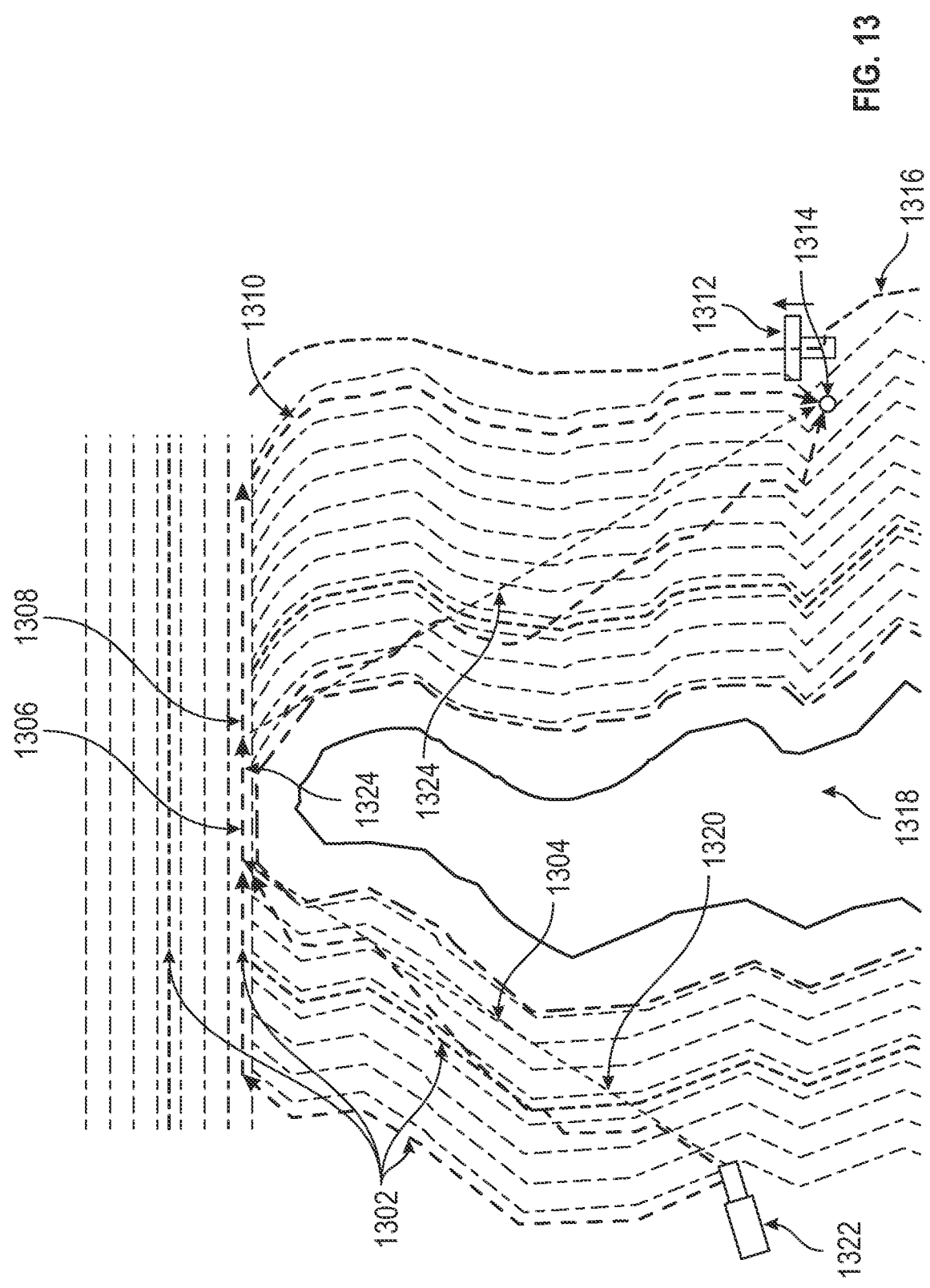
FIG. 13 is a schematic view of another example field including an agricultural machine and initial and example refined mitigation paths.

FIG. 13 illustrates a schematic view of another example field including an agricultural machine and initial and example refined mitigation paths. The agricultural machine 1322, which may include a tractor, grain cart, implement or the like, may be directed to a target location such as a static location or dynamic location (e.g., a target vehicle operating in a field). In one example, an initial (base) mitigation path 1320, 1324 may be generated based on a detected obstacle, such as unharvested crops, between the agricultural machine 1322 and a target location (e.g., a location in the field, target vehicle moving or static or the like). The initial mitigation path 1320, 1324 includes one or more straight line segments, contour segments or the like as previously discussed herein. In various examples, the target location 1312 may include a second machine or vehicle, such as a combine conducting operations in the field (e.g., moving). In some examples, the target location includes an offset locus 1314 positioned proximate to the target vehicle for guidance of the agricultural machine 1322 to a location proximate to the target vehicle (e.g., for crop offloading to the agricultural machine).

In various embodiments, the obstacle 1318 may include (unharvested) crops, other vehicles, livestock, environmental features (e.g., bodies of water, ditches, fences or the like). As shown, the obstacle 1318 is in solid lines and an anticollision border is provided around the obstacle to minimize collisions between the ag vehicle and the obstacle. The initial mitigation path 1320, 1324 is generated based on the obstacle 1318 including the associated exclusion zone (or anticollision border). An indexed path 1302 may include an indexed previous path of a prior vehicle, such as a preceding agricultural vehicle (grain cart) or vehicle that operated in the field earlier in the season, such as a planter, cultivator, sprayer or the like. As described herein the indexed path 1302 may be used as a 'loaded' mitigation path or used to determine the loaded mitigation path (e.g., provides the overall route and onboard sensors guide the ground engaging elements between crop rows).

As provided herein, the agricultural machine 1322 (or agricultural vehicle) follows a refined mitigation path 1304, 1306 based on the initial mitigation path while at the same time minimizing perturbations of the agricultural vehicle (e.g., rocking, oscillations, vibration, whipping of agricultural implements or the like) that may damage the agricultural vehicle or components of the vehicle. Along the head row the refined mitigation path 1304, 1306 and indexed path 1302 are similar (e.g., identical or proximate to each other with a similar profile) because the head row provides the shortest path to the next segment of the mitigation path (e.g., from the obstacle to the target location/vehicle or from the agricultural vehicle present position to the next departure location 1308).

In some examples, a loaded mitigation path 1310 (an example refined mitigation path) is provided. In an example including the agricultural vehicle 1322 having one or more characteristics that achieve a threshold (e.g., cart weight, load or the like), the agricultural vehicle 1322 is guided along a loaded mitigation path 1310, for instance along a previous indexed path of prior agricultural vehicles and between harvested crop rows that navigates around obstacles while moving toward the target location, and maintaining the ground engaging elements of the agricultural vehicle between crop rows. In some examples, crossing of crop rows (e.g., furrows) may be minimized (eliminated or reduced) to minimize rocking of the loaded agricultural vehicle, such as a loaded or partly loaded agricultural vehicle that would otherwise be subject to greater damage if crossing over furrows because of its increased load/weight. In various examples, a previous path 1316 may be used, such as when the indexed path includes the ongoing (e.g., updated) path or progress of the target vehicle indexed for use with the refined mitigation path.

FIG. 14 illustrates a schematic view of one example a guidance module and mitigation path refinement module. In various examples, the guidance module 1402 generates a base mitigation path (including generation of an updated base mitigation path after arresting of mitigation editing). The guidance module 1402 is configured to communicate with vehicle parameter sensors 1404 mounted on one or more of the agricultural vehicle, agricultural implement, or agricultural machine (including one or more of the vehicle or implement). The guidance module 1402 is further configured to communicate with a steering interface 1406 to convey guidance instructions to driving and operation controls (e.g., steering, throttle, brakes, transmission, implement actuators or the like). A mitigation path refinement module 1408 may include a vehicle parameter comparator 1410 and a mitigation path editor 1412. The mitigation path refinement module 1408 may conduct editing of the base mitigation path based on evaluated vehicle parameters, for instance corresponding to dynamic loading of the agricultural machine (e.g., vehicle, implement or both). An example mitigation path refinement module and algorithm is shown in FIG. 15.

FIG. 15 illustrates a schematic view of a mitigation path refinement module implementing an example algorithm for refinement of a mitigation path. In various embodiments, the mitigation path refinement module, such as mitigation path refinement module 1408 in FIG. 14, may receive data related to an amount of a load in a cart at step 1500, and compare the vehicle parameter data to determine how 'full' the cart is with the current load at step 1504. In various embodiments, an agricultural vehicle load comparator compares a load characteristic of the agricultural vehicle, such as cart weight, volume, static hitch load or the like with a load threshold. In an example, the mitigation path refinement module guides the agricultural vehicle along indexed paths (e.g., of previous vehicle travel) toward the target location if the load characteristics meets or exceeds the load threshold.

In one example algorithm, if the cart load is greater than or equal to half full, the system follows indexed previous paths (e.g., of previous vehicle travel) toward a companion vehicle or target location, at step 1506. If the cart load is less than half full (as an example), at step 1502 the present algorithm begins a prescribed route that may include one or more of a mitigation path if an obstacle is present or a target line if obstacle is absent, including crossing of a row between the vehicle location and the companion vehicle or target location, to minimize distance to the companion vehicle or target location. In various embodiments, the mitigation path refinement module guides the agricultural vehicle along the initial mitigation path (e.g., around obstacles, toward the target location or the like) and crosses over crop rows, for instance along crossing segments. As discussed herein, one or more parameter sensors monitor vehicle parameters as the agricultural vehicle traverses crop rows to determine if deviation from the initial mitigation path is warranted. For instance, if the comparison between the measured parameter exceeds a parameter threshold then the mitigation path refinement module arrests crossing over crop rows and guides the agricultural vehicle instead along indexed segments (e.g., aligned with or proximate to an indexed path that follows the contour of the crop rows).

At step 1508, a gyroscopic value is compared to a machine rocking threshold or a hitch weight value is compared to a hitch weight threshold (or dynamic force). In various examples, a vehicle parameter comparator, such as mitigation path refinement module 1410 in FIG. 14, compares one or more vehicle parameters (measured or sensed with parameter sensors) with parameter thresholds, and based on the deviation the mitigation path refinement module determines the type of guidance to provide the agricultural vehicle. The vehicle parameters include one or more characteristics including but not limited to gyroscopic or inertial measurement unit (IMU) values (e.g., force, moment, vibration, oscillation or the like, potentially assessed in combination with the ag vehicle load or other characteristics), hitch loads (e.g., dynamic force experience by sensors associated with a hitch) or the like.

In various examples, the algorithm proceeds to determine, at step 1510, if the vehicle is turning around, e.g., if the vehicle has changed direction by greater than or equal to 100 degrees, and crossing the crop rows a short distance, e.g., proximate to a row end. In various examples, a turn assessment module identifies if a heading change of the vehicle is part of a turnaround procedure (e.g., at the end of a row) or a heading change as part of navigation along or relative to a mitigation path. If the vehicle is turning around, at step 1518 the mitigation path refinement module will decrease the speed of the vehicle by one or more increments limited by a speed floor. In various examples, the mitigation path refinement module may decrease the agricultural vehicle speed according to the evaluation at the vehicle parameter comparator if the parameter threshold is met or exceeded. In an example, the decrease in speed is based on the magnitude of deviation from the threshold (e.g., speed implementation). In another example, the decrease in speed has a floor to prevent stopping of the agricultural vehicle.

According to the depicted embodiment, if the vehicle is not turning around, at step 1512 the mitigation path refinement module may change the heading of the agricultural vehicle to be more parallel to the row, change speed, or both. In various embodiments, the guidance path includes an indexed segment (including refined crossing angle) implementation with a mitigation path editor. Upon meeting or exceeding one or more parameter thresholds, the mitigation path refinement module in a first example decreases the crossing angle between the agricultural vehicle ground engaging elements and the crop rows, and crossing over the next crop row is conducted. If the vehicle parameters remain above thresholds, the crossing angle is refined lower in a graduated manner up to and including eventual guidance along the indexed path (zero degrees relative to the crop row).

Optionally, the indexed segment is selected from various potential segments including a refined (decreased) crossing angle, refined (decreased) speed, combinations of the same, and optionally increased refinements of the same, including increased angle, speed (e.g., based on specified gains) or both, if the vehicle parameter falls beneath one or more parameter thresholds. The segment selected (e.g., with a selection module of the mitigation path editor) is, in one example, chosen based on the difference between the one or more vehicle parameters and the associated parameter thresholds.

In one example, guidance along the indexed segment (or at the refined crossing angle) continues until the vehicle parameter is below the parameter threshold, and then guidance is conducted along the initial mitigation path (e.g., a crossing segment) or at the original crossing angle with monitoring of the vehicle parameter comparator. In another example, guidance along the indexed segment or refined crossing angle continues for a specified time (optionally with monitoring of the vehicle parameter(s)), such as a settle period, and then control is handed back to the initial mitigation path module or the crossing angle is reset to the larger value after the settle period (and optionally if the vehicle parameter falls beneath the threshold) to begin crossing of rows.

In various embodiments, the algorithm includes determining whether the heading of the row is the same as the heading of the agricultural vehicle at step 1514. If the heading is the same, at step 1516 the algorithm arrests or discontinues crossing of rows, and continues on indexed previous paths toward a companion vehicle or target location (e.g., to decrease distance to the companion vehicle or target location). Thus, if the adjusted crossing angle is aligned with the crop row(s), crossing over crop rows is arrested, and the agricultural vehicle is guided instead along indexed segments (e.g., aligned with or proximate to an indexed path that follows the contour of the crop rows).

In various embodiments, if the heading of the row is not the same as the heading of the agricultural vehicle, at step 1520 the algorithm may pause for a settle period and reevaluate one or more of the gyroscopic value or the hitch weight of the agricultural vehicle. Optionally, the mitigation path editor edits the mitigation path for a period corresponding to one or more of a specified pause or settle period, upon the vehicle parameters falling below thresholds or the like. In various embodiments, after expiration of the specified period or upon the parameters falling below thresholds, the agricultural vehicle implements the base mitigation path from the end of the present refined mitigation segment toward the target position (e.g., the new initial mitigation path is generated from the refined segment toward the target position).

Figure 16:
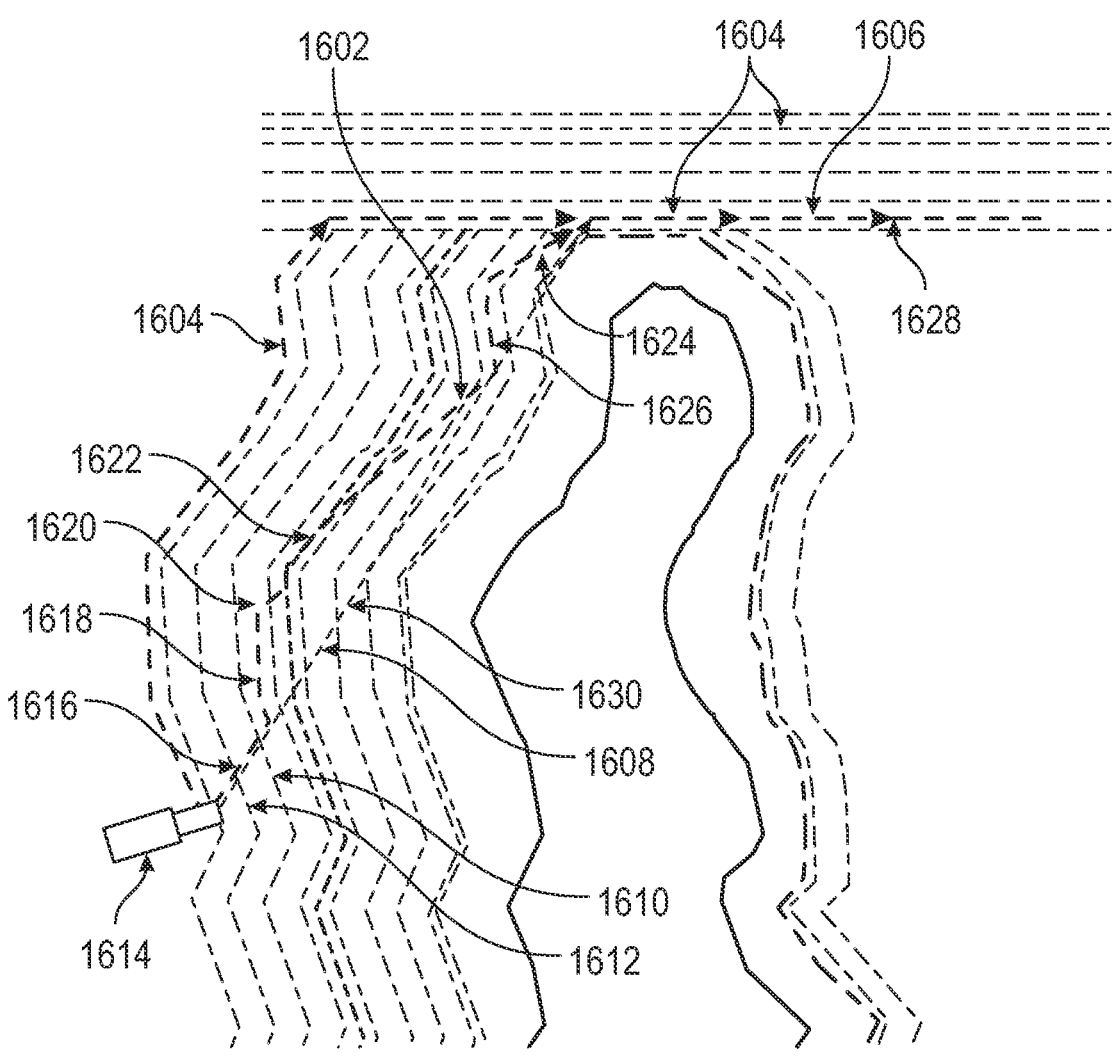
FIG. 16 is a detailed view of a portion of FIG. 13 illustrating example component segments of a refined mitigation path.

FIG. 16 illustrates a detailed view of a portion of FIG. 13 illustrating example component segments of a refined mitigation path. The agricultural machine (or agricultural vehicle) 1614, which may include a tractor, grain cart, implement or the like, may be directed to a target location such as a static location or dynamic location (e.g., a target vehicle operating in a field). In one example, an initial mitigation path 1608 may be generated based on a detected obstacle, such as unharvested crops, between the agricultural machine 1614 and a target location (e.g., a location in the field, target vehicle moving or static or the like). As shown, the agricultural machine 1614 begins a refined mitigation path 1602 by following the initial mitigation path 1608, and deviates from the initial mitigation path 1608 as vehicle parameters achieve perturbation thresholds. The initial mitigation path 1608 includes one or more straight line segments, contour segments or the like as previously discussed herein.

In some examples, the agricultural field includes a first crop row 1612 and a second crop row 1610 crossed by the agricultural vehicle along the initial mitigation path 1608. In the present example, one or more vehicle parameters (e.g., gyro value, hitch load or the like) exceed perturbation thresholds while crossing the second crop row 1610, and the mitigation path refinement module guides the agricultural vehicle along an indexed segment proximate to (e.g., aligned with) a previous indexed path 1604 of a vehicle that traveled in the corresponding portion of the field (e.g., a planter, sprayer, or the like, for instance a planter that provided crop rows/furrows that may cause perturbations).

The indexed path 1604 may include an indexed previous path of a prior vehicle, such as a preceding agricultural vehicle (grain cart) or vehicle that operated in the field earlier in the season, such as a planter, cultivator, sprayer or the like. As described herein the indexed path 1604 may be used as a 'loaded' mitigation path or used to determine the loaded mitigation path (e.g., provides the overall route and onboard sensors guide the ground engaging elements between crop rows). In various examples, the loaded mitigation path minimizes (e.g., decreases or eliminates) crossing of crop rows to accordingly minimize dynamic motion of the agricultural vehicle. As provided herein, the agricultural machine 1614 (or agricultural vehicle) follows a refined mitigation path 1602 based on the initial mitigation path 1608 while at the same time minimizing perturbations of the agricultural vehicle (e.g., rocking, oscillations, vibration, whipping of agricultural implements or the like) that may damage the agricultural vehicle or components of the vehicle.

In one example, the refined mitigation path 1602 includes a first crossing segment 1616. In this example, the agricultural vehicle 1614 crosses the first crop row 1612 and the second crop row 1610. For instance, one or more vehicle parameters (e.g., vibration, oscillation, force, hitch weight or the like) are below perturbation thresholds that indicate the agricultural vehicle is rocking or oscillating less than specified by the corresponding thresholds and crossing of the first crop row and then the second crop row is conducted. In one example, the refined mitigation path 1602 includes a first indexed segment 1618. In this example, upon crossing the second crop row 1610 one or more vehicle parameters (e.g., gyro value, hitch load or the like) meet or exceed corresponding perturbation thresholds and the agricultural vehicle 1614 arrests crossing of crop rows and instead follows the first indexed segment 1618 (e.g., proximate to the previously indexed path 1604) to minimize dynamic motion (e.g., rocking or oscillation) while generally following the initial mitigation path 1608 (e.g., following one or more components of the initial mitigation path 1608, such as the x or y components).

In an example, the refined mitigation path 1602 includes a second crossing segment 1620. In this example, after one or more vehicle parameters decrease below perturbation thresholds and/or after a specified settle period (e.g., 10 sec, 20 sec, 30 sec or the like), the mitigation path refinement module guides the agricultural vehicle 1614 across at least one crop row toward the initial mitigation path 1608, for instance toward a detected edge/portion of the obstacle as discussed herein. The mitigation path refinement module continues to guide the agricultural vehicle 1614 to cross crop rows until/when one or more vehicle parameters (e.g., gyro value, hitch load or the like) meet or exceed perturbation thresholds. At that time, the module redirects the vehicle to another indexed segment or alternatively adjusts one or both of crossing angle (so less transverse to the crop row) or speed (slower).

In an example, the refined mitigation path 1602 includes a second indexed segment 1606. In this example, along a head row or transverse row that extends along an obstacle the mitigation path refinement module determines the initial mitigation path 1608 extends along the obstacle (including the border of the obstacle) and arrests crossing of crop rows until the departure point 1628 is reached from the obstacle to the target location. Upon arrival at the departure point 1628 the mitigation path refinement module is reactivated. In various examples, additional indexed segments 1622, 1626 and crossing segments 1624, 1630 of the refined mitigation path are included.

Figure 12:
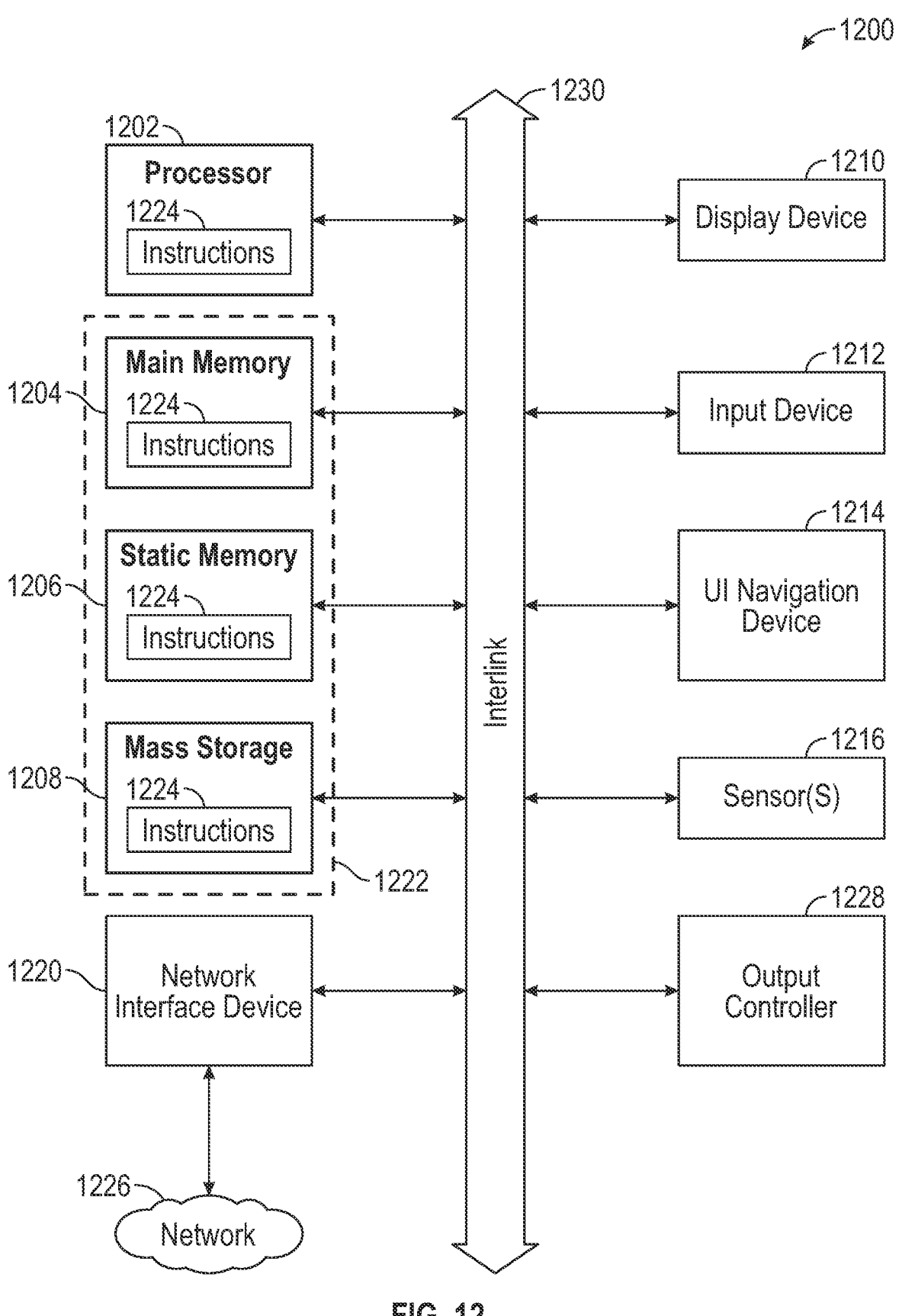
FIG. 12 is an example machine that includes the autonomous agricultural machine navigation system.

FIG. 12 illustrates a block diagram of an example machine 1200 upon which any one or more of the techniques (e.g., methodologies) discussed herein can perform. Examples, as described herein, can include, or can operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 can operate as a standalone device or can be connected (e.g., networked) to other machines. In a networked deployment, the machine 1200 can operate in the capacity of a server machine, a client machine, or both in server-client network environments. In an example, the machine 1200 can act as a peer machine in peer-to-peer (P2P) (or other distributed) network environment. The machine 1200 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 can include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which can communicate with each other via an interlink (e.g., bus) 1230. The machine 1200 can further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 can be a touch screen display. The machine 1200 can additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 can include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). Optionally, the output controller 1228 includes or is configured to interface with a steering unit of the vehicle. For instance, the output controller acts as a steering interface and provides guidance instructions including one or more of the travel path (e.g., an intercept path), the mitigation path (e.g., including one or more of the straight line segments, contoured segments, starting and exit locations, departure or transition segments or the like) to a steering unit for autonomous or semi-autonomous driving control of the agricultural machine. The output controller 1228 or interfaced steering unit controls one or more of steering, throttle, breaks, transmission or the like.

Registers of the processor 1202, the main memory 1204, the static memory 1206, or the mass storage 1208 can be, or include, a machine readable medium 1222 on which is stored one or more sets of data structures or instructions 1224 (e.g., software) embodying or utilized by any one or more of the techniques or functions described herein. The instructions 1224 can also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 can constitute the machine-readable media 1222. While the machine readable medium 1222 is illustrated as a single medium, the term "machine readable medium" can include a single medium or multiple media (e.g., a centralized or distributed database, and/or associated caches and servers) configured to store the one or more instructions 1224.

The term "machine readable medium" can include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 can be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1202.11 family of standards known as Wi-Fi®, IEEE 1202.16 family of standards known as WiMax®), IEEE 1202.15.4 family of standards, peer-to-peer (P2P) networks, among others. In an example, the network interface device 1220 can include one or more physical jacks (e.g., Ethernet, coaxial, or phone jacks) or one or more antennas to connect to the communications network 1226. In an example, the network interface device 1220 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200, and includes digital or analog communications signals or other intangible medium to facilitate communication of such software. A transmission medium is a machine readable medium.

Various Notes & Examples

Example 1 is a navigation system for an agricultural machine, the system comprising: a guidance module configured to obtain a travel path from an agricultural machine position to a target position in a field, the guidance module including: a perception module configured to determine a first target line, the first target line extending from the agricultural machine position to the target position; an obstacle detection module configured to detect a first obstacle disposed in the first target line between the agricultural machine position and the target position, the first obstacle having a first obstacle boundary that intersects the first target line at first and second intersections, the first intersection closer than the second intersection to the agricultural machine position; a mitigation module configured to obtain a mitigation path around the first obstacle based on the first target line and the boundary of the first obstacle, wherein the mitigation path includes at least one mitigation segment having a starting position and an ending position, the mitigation module including: an entrance module configured to determine the starting position of the mitigation path based on a second target line, the second target line extending from the agricultural machine position to the first obstacle boundary; and an exit module configured to determine the ending position of the mitigation path based on a third target line, the third target line extending from the first obstacle boundary to the target position; and a convergence module configured to combine the mitigation path with the travel path.

In Example 2, the subject matter of Example 1 optionally includes wherein the target position comprises a position of a second agricultural machine and the guidance module is configured to automatically update the travel path by determining a new mitigation path responsive to a change in the position of the second agricultural machine.

In Example 3, the subject matter of any one or more of Examples 1-2 optionally include wherein the guidance module is configured to obtain, from a memory module, map data that is indicative of the first obstacle boundary.

In Example 4, the subject matter of Example 3 optionally includes wherein the map data is indicative of a region enclosing the first obstacle.

In Example 5, the subject matter of Example 4 optionally includes where in the first obstacle boundary has a shape of first obstacle.

In Example 6, the subject matter of any one or more of Examples 1-5 optionally include wherein the obstacle detection module or the perception module includes at least one of: a LIDAR device; a radar device; a camera; a laser device; or a positioning device.

In Example 7, the subject matter of any one or more of Examples 1-6 optionally include wherein the first target line includes a scan line that traverses the first obstacle.

In Example 8, the subject matter of any one or more of Examples 1-7 optionally include wherein the at least one mitigation segment extends along a contour of the boundary of the first obstacle.

In Example 9, the subject matter of any one or more of Examples 1-8 optionally include wherein the scanning module includes: a scan module that is configured to obtain a set of entry scan lines, wherein an entry scan line extends from the agricultural machine position to a position on first obstacle boundary; a selector module that is configured to select an entry scan line from the set of one or more entry scan lines based on: an intersection of the selected entry scan line with the first obstacle; or a length of the selected entry scan line relative to other entry scan lines; and wherein the entrance module is configured to determine the starting position of the mitigation path based on the intersection of the selected entry scan line and the first obstacle boundary.

In Example 10, the subject matter of Example 9 optionally includes wherein: the scan module is configured to obtain a sequential set of entry scan lines by sequentially scanning the field along the first obstacle boundary in a first direction to generate scan lines that extend from the agricultural machine position to one or more positions along the first obstacle boundary; and the selected entry scan line is a last scan line in the sequential set of entry scan lines that intersects the first obstacle boundary.

In Example 11, the subject matter of any one or more of Examples 9-10 optionally include wherein the starting position of the mitigation path is a position at the intersection of the selected entry scan line and the first obstacle boundary.

In Example 12, the subject matter of any one or more of Examples 1-11 optionally include wherein the scanning module includes: a scan module configured to obtain a set of exit scan lines, wherein an exit scan line extends from a position on the first obstacle to the target position; a selector module to select an exit scan line from the set of one or more exit scan lines based on at least one of: an intersection of the exit scan line with the first obstacle; or a length of the exit scan line relative to other entry scan lines; and the exit module is configured to determine the ending position of the mitigation path based on the selected exit scan line.

In Example 13, the subject matter of Example 12 optionally includes wherein: the scan module is configured to obtain sequential set of exit scan lines by sequentially scanning the field in a first direction from one or more positions along the first obstacle boundary to generate scan lines that extend from the one or more position along the first obstacle boundary to the target position, and the selected exit scan line is a first scan line in the sequential set of exit scan lines that does not intersect the first obstacle boundary at any point between the end points of the exit scan line.

In Example 14, the subject matter of any one or more of Examples 12-13 optionally include wherein the ending position of the mitigation path is a position at the intersection of the selected entry scan line and the first obstacle boundary.

In Example 15, the subject matter of any one or more of Examples 1-14 optionally include a transition module to obtain a transition path including a curved path that connects the agricultural machine position to the starting point of the mitigation path, wherein the curved path is determined based on at least one of a turning capability of the agricultural machine or a predetermined user experience parameter, wherein the convergence module is configured to combine the transition path with the mitigation path.

In Example 16, the subject matter of any one or more of Examples 1-15 optionally include wherein the guidance module comprises: a path intercept module that is configured to obtain an intercept path, the intercept path including: a fourth target line, the fourth target line extending from the ending position of the mitigation path to an intercept point proximate the target point; and a curved path from the intercept point to the target point, wherein the convergence module is configured to combine the intercept path with the mitigation path and the travel path.

In Example 17, the subject matter of any one or more of Examples 1-16 optionally include wherein the guidance module comprises a path filter module that is configured to adjust a curvature of path segments in the travel path based on at least one of a curvature rate or a maximum curvature of the agricultural machine.

In Example 18, the subject matter of any one or more of Examples 1-17 optionally include wherein the mitigation module is configured to obtain the mitigation path based on a length of the at least one mitigation segment.

In Example 19, the subject matter of any one or more of Examples 1-18 optionally include wherein the guidance module comprises: a static path module that is configured to obtain a second travel path for the agricultural machine to a target position in the field, the static path module including: a projection module that is configured to project the agricultural machine position to a projected position on the travel path; and an iterator module to obtain the second travel path by using the projected agricultural machine position as the agricultural machine position.

Example 20 is a method for a navigation method for an agricultural machine, the method comprising: obtaining a travel path from an agricultural machine position to a target position in a field by: determining a first target line, the first target line extending from the agricultural machine position to the target position; detecting a first obstacle disposed in the first target line between the agricultural machine position and the target position, the first obstacle having a first obstacle boundary that intersects the first target line at first and second intersections, the first intersection closer than the second intersection to the agricultural machine position; obtaining a mitigation path around the first obstacle based on the first target line and the boundary of the first obstacle by: determining a starting position of the mitigation path based on a second target line, the second target line extending from the agricultural machine position to the first obstacle boundary; and determining an ending position of the mitigation path based on a third target line, the third target line extending from the first obstacle boundary to the target position; and combining the mitigation path with the travel path.

In Example 21, the subject matter of Example 20 optionally includes wherein the target position comprises a position of a second agricultural machine, and the method further includes automatically updating the travel path by determining a new mitigation path responsive to a change in the position of the second agricultural machine.

In Example 22, the subject matter of any one or more of Examples 20-21 optionally include obtaining map data that is indicative of the first obstacle boundary.

In Example 23, the subject matter of Example 22 optionally includes wherein the map data is indicative of a region enclosing the first obstacle.

In Example 24, the subject matter of Example 23 optionally includes where in the first obstacle boundary has a shape of first obstacle.

In Example 25, the subject matter of any one or more of Examples 20-24 optionally include determining the first target line, the second target line, or detecting the first obstacle using at least one of: a LIDAR device; a radar device; a camera; a laser device; or a positioning device.

In Example 26, the subject matter of any one or more of Examples 20-25 optionally include wherein the first target line includes a scan line that traverses the first obstacle.

In Example 27, the subject matter of any one or more of Examples 20-26 optionally include wherein the at least one mitigation segment extends along a contour of the boundary of the first obstacle.

In Example 28, the subject matter of any one or more of Examples 20-27 optionally include obtaining a set of entry scan lines, wherein an entry scan line extends from the agricultural machine position to a position on first obstacle boundary; selecting an entry scan line from the set of one or more entry scan lines based on: an intersection of the selected entry scan line with the first obstacle; or a length of the selected entry scan line relative to other entry scan lines; and determining the starting position of the mitigation path based on the intersection of the selected entry scan line and the first obstacle boundary.

In Example 29, the subject matter of Example 28 optionally includes obtaining a sequential set of entry scan lines by sequentially scanning the field along the first obstacle boundary in a first direction to generate scan lines that extend from the agricultural machine position to one or more positions along the first obstacle boundary, wherein the selected entry scan line is a last scan line in the sequential set of entry scan lines that intersects the first obstacle boundary.

In Example 30, the subject matter of any one or more of Examples 28-29 optionally include wherein the starting position of the mitigation path is a position at the intersection of the selected entry scan line and the first obstacle boundary.

In Example 31, the subject matter of any one or more of Examples 20-30 optionally include obtaining a set of exit scan lines, wherein an exit scan line extends from a position on the first obstacle to the target position; selecting an exit scan line from the set of one or more exit scan lines based on at least one of: an intersection of the exit scan line with the first obstacle; or a length of the exit scan line relative to other entry scan lines; and determining the ending position of the mitigation path based on the selected exit scan line.

In Example 32, the subject matter of Example 31 optionally includes obtaining sequential set of exit scan lines by sequentially scanning the field in a first direction from one or more positions along the first obstacle boundary to generate scan lines that extend from the one or more position along the first obstacle boundary to the target position, and selecting, as the selected exit scan line, a first scan line in the sequential set of exit scan lines that does not intersect the first obstacle boundary at any point between the end points of the exit scan line.

In Example 33, the subject matter of any one or more of Examples 31-32 optionally include wherein the ending position of the mitigation path is a position at the intersection of the selected entry scan line and the first obstacle boundary.

In Example 34, the subject matter of any one or more of Examples 20-33 optionally include obtaining a transition path including a curved path that connects the agricultural machine position to the starting point of the mitigation path, wherein the curved path is determined based on at least one of a turning capability of the agricultural machine or a predetermined user experience parameter, and combining the transition path with the mitigation path.

In Example 35, the subject matter of any one or more of Examples 20-34 optionally include obtaining an intercept path, the intercept path including: a fourth target line, the fourth target line extending from the ending position of the mitigation path to an intercept point proximate the target point; and a curved path from the intercept point to the target point; and combining the intercept path with the mitigation path and the travel path.

In Example 36, the subject matter of any one or more of Examples 20-35 optionally include adjusting a curvature of path segments in the travel path based on at least one of a curvature rate or a maximum curvature of the agricultural machine.

In Example 37, the subject matter of any one or more of Examples 20-36 optionally include obtaining the mitigation path based on a length of the at least one mitigation segment.

In Example 38, the subject matter of any one or more of Examples 20-37 optionally include obtaining a second travel path for the agricultural machine to a target position in the field by: projecting the agricultural machine position to a projected position on the travel path; and obtaining the second travel path by using the projected agricultural machine position as the agricultural machine position.

Example 39 is a device for a navigation device for an agricultural machine, the device comprising: a memory including instructions; and processing circuitry that is configured by the instructions to: obtain a travel path from an agricultural machine position to a target position in a field by: determining a first target line, the first target line extending from the agricultural machine position to the target position; detecting a first obstacle disposed in the first target line between the agricultural machine position and the target position, the first obstacle having a first obstacle boundary that intersects the first target line at first and second intersections, the first intersection closer than the second intersection to the agricultural machine position; obtaining a mitigation path around the first obstacle based on the first target line and the boundary of the first obstacle by: determining a starting position of the mitigation path based on a second target line, the second target line extending from the agricultural machine position to the first obstacle boundary; and determining an ending position of the mitigation path based on a third target line, the third target line extending from the first obstacle boundary to the target position; and combine the mitigation path with the travel path.

In Example 40, the subject matter of Example 39 optionally includes wherein the target position comprises a position of a second agricultural machine, and the processing circuitry is configured by the instructions to automatically update the travel path by determining a new mitigation path responsive to a change in the position of the second agricultural machine.

In Example 41, the subject matter of any one or more of Examples 39-40 optionally include wherein the processing circuitry is configured by the instructions to obtain map data that is indicative of the first obstacle boundary.

In Example 42, the subject matter of Example 41 optionally includes wherein the map data is indicative of a region enclosing the first obstacle.

In Example 43, the subject matter of Example 42 optionally includes where in the first obstacle boundary has a shape of first obstacle.

In Example 44, the subject matter of any one or more of Examples 39-43 optionally include wherein the processing circuitry is configured by the instructions to determine the first target line, the second target line, or detecting the first obstacle using at least one of: a LIDAR device; a radar device; a camera; a laser device; or a positioning device.

In Example 45, the subject matter of any one or more of Examples 39-44 optionally include wherein the first target line includes a scan line that traverses the first obstacle.

In Example 46, the subject matter of any one or more of Examples 39-45 optionally include wherein the at least one mitigation segment extends along a contour of the boundary of the first obstacle.

In Example 47, the subject matter of any one or more of Examples 39-46 optionally include wherein the processing circuitry is configured by the instructions to: obtain a set of entry scan lines, wherein an entry scan line extends from the agricultural machine position to a position on first obstacle boundary; select an entry scan line from the set of one or more entry scan lines based on: an intersection of the selected entry scan line with the first obstacle; or a length of the selected entry scan line relative to other entry scan lines; and determine the starting position of the mitigation path based on the intersection of the selected entry scan line and the first obstacle boundary.

In Example 48, the subject matter of Example 47 optionally includes wherein the processing circuitry is configured by the instructions to: obtain a sequential set of entry scan lines by sequentially scanning the field along the first obstacle boundary in a first direction to generate scan lines that extend from the agricultural machine position to one or more positions along the first obstacle boundary, wherein the selected entry scan line is a last scan line in the sequential set of entry scan lines that intersects the first obstacle boundary.

In Example 49, the subject matter of any one or more of Examples 47-48 optionally include wherein the starting position of the mitigation path is a position at the intersection of the selected entry scan line and the first obstacle boundary.

In Example 50, the subject matter of any one or more of Examples 39-49 optionally include wherein the processing circuitry is configured by the instructions to: obtain a set of exit scan lines, wherein an exit scan line extends from a position on the first obstacle to the target position; select an exit scan line from the set of one or more exit scan lines based on at least one of: an intersection of the exit scan line with the first obstacle; or a length of the exit scan line relative to other entry scan lines; and determine the ending position of the mitigation path based on the selected exit scan line.

In Example 51, the subject matter of Example 50 optionally includes wherein the processing circuitry is configured by the instructions to: obtain sequential set of exit scan lines by sequentially scanning the field in a first direction from one or more positions along the first obstacle boundary to generate scan lines that extend from the one or more position along the first obstacle boundary to the target position, and select, as the selected exit scan line, a first scan line in the sequential set of exit scan lines that does not intersect the first obstacle boundary at any point between the end points of the exit scan line.

In Example 52, the subject matter of any one or more of Examples 50-51 optionally include wherein the ending position of the mitigation path is a position at the intersection of the selected entry scan line and the first obstacle boundary.

In Example 53, the subject matter of any one or more of Examples 39-52 optionally include wherein the processing circuitry is configured by the instructions to: obtain a transition path including a curved path that connects the agricultural machine position to the starting point of the mitigation path, wherein the curved path is determined based on at least one of a turning capability of the agricultural machine or a predetermined user experience parameter, and combine the transition path with the mitigation path.

In Example 54, the subject matter of any one or more of Examples 39-53 optionally include wherein the processing circuitry is configured by the instructions to: obtain an intercept path, the intercept path including: a fourth target line, the fourth target line extending from the ending position of the mitigation path to an intercept point proximate the target point; and a curved path from the intercept point to the target point; and combine the intercept path with the mitigation path and the travel path.

In Example 55, the subject matter of any one or more of Examples 39-54 optionally include wherein the processing circuitry is configured by the instructions to adjust a curvature of path segments in the travel path based on at least one of a curvature rate or a maximum curvature of the agricultural machine.

In Example 56, the subject matter of any one or more of Examples 39-55 optionally include wherein the processing circuitry is configured by the instructions to obtain the mitigation path based on a length of the at least one mitigation segment.

In Example 57, the subject matter of any one or more of Examples 39-56 optionally include wherein the processing circuitry is configured by the instructions to: obtain a second travel path for the agricultural machine to a target position in the field by: projecting the agricultural machine position to a projected position on the travel path; and obtaining the second travel path by using the projected agricultural machine position as the agricultural machine position.

Example 58 is at least one machine-readable medium including instructions that, when executed by processing circuitry, cause the processing circuitry to perform operations to implement of any of Examples 1-57.

Example 59 is an apparatus comprising means to implement of any of Examples 1-57.

Example 60 is a navigation system for an agricultural machine, the system comprising: at least one vehicle parameter sensor configured to measure one or more vehicle parameters indicating dynamic loading of the agricultural machine; a guidance module configured to obtain a base mitigation path from an agricultural machine position to a target position in a field that navigates around one or more obstacles; a mitigation path refinement module in communication with the at least one vehicle parameter sensor and the guidance module, the mitigation path refinement module is configured to edit the base mitigation path according to dynamic loading of the agricultural machine, the mitigation path refinement module includes: a vehicle parameter comparator configured to compare the measured one or more vehicle parameters with associated parameter thresholds; and a mitigation path editor configured to edit the base mitigation path to include one or more refined mitigation segments according to the comparison of the one or more vehicle parameters; and a steering interface in communication with the mitigation path refinement module, the steering interface configured to implement the base mitigation path and one or more refined mitigation segments and guide the agricultural vehicle toward the target position.

In Example 61, the subject matter of Example 60 optionally includes an indexed path module configured to obtain an indexed path of a previous vehicle passage through the field.

In Example 62, the subject matter of Example 61 optionally includes wherein the one or more refined mitigation segments include one or more indexed previous path segments of the indexed path; and the mitigation path editor is configured to include the one or more indexed previous path segments if the measured one or more vehicle parameters are equal to or greater than the associated parameter thresholds.

In Example 63, the subject matter of Example 61 optionally includes a second vehicle parameter sensor configured to determine a load of the agricultural machine; wherein the mitigation path refinement module is configured to edit the base mitigation path according to the determined load of the agricultural machine; and the mitigation path editor is configured to edit the base mitigation path to include indexed previous path segments according to the determined load of the agricultural machine.

In Example 64, the subject matter of any one or more of Examples 60-63 optionally includes wherein the one or more refined mitigation segments include one or more moderated speed segments having a decreased speed relative to an agricultural machine speed; and the mitigation path editor is configured to include the one or more moderated speed segments if the measured one or more vehicle parameters are equal to or greater than the associated parameter thresholds.

In Example 65, the subject matter of any one or more of Examples 60-64 optionally includes wherein the one or more refined mitigation segments include one or more crossing angle segments having a decreased crop crossing angle of the agricultural machine relative to the base mitigation path; and the mitigation path editor is configured to include the one or more crossing angle segments if the measured one or more vehicle parameters are equal to or greater than the associated parameter thresholds.

In Example 66, the subject matter of any one or more of Examples 60-65 optionally includes wherein the mitigation path refinement module includes a selection module configured to choose between at least two refined mitigation segments.

In Example 67, the subject matter of Example 66 optionally includes wherein the selection module is in communication with the vehicle parameter comparator, and the selection module is configured to choose between the at least two refined mitigation segments according to the comparison of the one or more vehicle parameters.

In Example 68, the subject matter of Example 67 optionally includes wherein the at least two refined mitigation segments include at least two of moderated speed, crossing angle or indexed previous path segments.

In Example 69, the subject matter of any one or more of Examples 60-68 optionally includes wherein the mitigation path editor is configured to: arrest inclusion of the one or more refined mitigation segments if the measured one or more vehicle parameters are less than the associated parameter thresholds; and implement the base mitigation path from the included one or more refined mitigation segments to the target position.

In Example 70, the subject matter of any one or more of Examples 60-69 optionally includes wherein the guidance module is configured to obtain the base mitigation path from the agricultural machine position along the one or more refined mitigation segments to the target position.

In Example 71, the subject matter of any one or more of Examples 60-70 optionally includes wherein the least one vehicle parameter sensor includes one or more of a gyro, inertial measurement unit (IMU), hitch load sensor, vibration sensor, oscillation sensor, orientation sensor, accelerometer, strain gauge or the like.

In Example 72, the subject matter of any one or more of Examples 60-71 optionally includes wherein the base mitigation path includes one or more of planned and ongoing guidance of the agricultural machine toward the target position.

Example 73 is at least one machine-readable medium including instructions that, when executed by processing circuitry, cause the processing circuitry to perform operations to implement of any of Examples 1-72.

Example 74 is an apparatus comprising means to implement of any of Examples 1-72.

Example 75 is a system to implement of any of Examples 1-72.

Example 76 is a method to implement of any of Examples 1-72.

Each of the non-limiting aspects or examples described herein may stand on its own or may be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A navigation system for an agricultural machine, the system comprising:

one or more processors configured to obtain a travel path from an agricultural machine position to a target position in a field, the one or more processors configured to:

determine a first target line, the first target line extending from the agricultural machine position to the target position;

detect a first obstacle disposed in the first target line between the agricultural machine position and the target position, the first obstacle having a first obstacle boundary that intersects the first target line at first and second intersections, the first intersection closer than the second intersection to the agricultural machine position;

obtain a mitigation path around the first obstacle based on the first target line and the boundary of the first obstacle, wherein the mitigation path includes at least one mitigation segment having a starting position and an ending position, and wherein to obtain the mitigation path the one or more processors are further configured to:

determine the starting position of the mitigation path based on a second target line, the second target line extending from the agricultural machine position to the first obstacle boundary;

determine the ending position of the mitigation path based on a third target line, the third target line extending from the first obstacle boundary to the target position, wherein the mitigation path is obtained based on a length of the at least one mitigation segment;

obtain an indexed path of a previous machine passage through the field, the indexed path comprising one or more segments aligned with crop rows to minimize crossing of crop rows;

determine a load of the agricultural machine; and edit the mitigation path to include the one or more segments of the indexed path according to the determined load of the agricultural machine when the load meets or exceeds a load threshold;

combine the mitigation path with the travel path to obtain a combined path; and control the agricultural machine using the combined path to guide the agricultural machine to the target position in the field.

2. The system of claim 1, wherein the target position comprises a position of a second agricultural machine and the one or more processors are configured to automatically update the travel path by determining a new mitigation path responsive to a change in the position of the second agricultural machine.

3. The system of claim 1, wherein the one or more processors are configured to obtain, from a memory, map data that is indicative of the first obstacle boundary.

4. The system of claim 3, wherein the map data is indicative of a region enclosing the first obstacle.

5. The system of claim 4, where in the first obstacle boundary has a shape of first obstacle.

6. The system of claim 1, further comprising at least one of:

a LIDAR device;

a radar device;

a camera;

a laser device; or a positioning device.

7. The system of claim 1, wherein the first target line includes a scan line that traverses the first obstacle.

8. The system of claim 1, wherein the at least one mitigation segment extends along a contour of the boundary of the first obstacle.

9. The system of claim 1, wherein the one or more processors are further configured to: obtain a set of entry scan lines, wherein an entry scan line extends from the agricultural machine position to a position on first obstacle boundary;

select an entry scan line from the set of entry scan lines based on:

an intersection of the selected entry scan line with the first obstacle; or a length of the selected entry scan line relative to other entry scan lines; and determine the starting position of the mitigation path based on the intersection of the selected entry scan line and the first obstacle boundary.

10. The system of claim 9, wherein the one or more processors are further configured to: obtain a sequential set of entry scan lines by sequentially scanning the field along the first obstacle boundary in a first direction to generate scan lines that extend from the agricultural machine position to one or more positions along the first obstacle boundary; and the selected entry scan line is a last scan line in the sequential set of entry scan lines that intersects the first obstacle boundary.

11. The system of claim 9, wherein the starting position of the mitigation path is a position at the intersection of the selected entry scan line and the first obstacle boundary.

12. The system of claim 1, wherein the one or more processors are further configured to:

obtain a set of exit scan lines, wherein an exit scan line extends from a position on the first obstacle to the target position;

select an exit scan line from the set of exit scan lines based on at least one of:

an intersection of the exit scan line with the first obstacle; or a length of the exit scan line relative to other entry scan lines; and determine the ending position of the mitigation path based on the selected exit scan line.

13. The system of claim 12, wherein the one or more processors are further configured to: obtain sequential set of exit scan lines by sequentially scanning the field in a first direction from one or more positions along the first obstacle boundary to generate scan lines that extend from the one or more position along the first obstacle boundary to the target position, and the selected exit scan line is a first scan line in the sequential set of exit scan lines that does not intersect the first obstacle boundary at any point between end points of the exit scan line.

14. The system of claim 12, wherein the ending position of the mitigation path is a position at the intersection of the selected entry scan line and the first obstacle boundary.

15. The system of claim 1, wherein the one or more processors are further configured to:

obtain a transition path including a curved path that connects the agricultural machine position to the starting position of the mitigation path, wherein the curved path is determined based on at least one of a turning capability of the agricultural machine or a predetermined user experience parameter, and configured to combine the transition path with the mitigation path.

16. The system of claim 1, wherein the one or more processors are further configured to:

obtain an intercept path, the intercept path including:

a fourth target line, the fourth target line extending from the ending position of the mitigation path to an intercept point proximate the target point; and a curved path from the intercept point to the target point, and configured to combine the intercept path with the mitigation path and the travel path.

17. The system of claim 1, wherein the one or more processors are configured to adjust a curvature of path segments in the travel path based on at least one of a curvature rate or a maximum curvature of the agricultural machine.

18. The system of claim 1, wherein the one or more processors are further configured to:

obtain a second travel path for the agricultural machine to a target position in the field, including:

project the agricultural machine position to a projected position on the travel path; and obtain the second travel path by using the projected agricultural machine position as the agricultural machine position.

19. A method for a navigation method for an agricultural machine, the method comprising:

obtaining a travel path from an agricultural machine position to a target position in a field by:

determining a first target line, the first target line extending from the agricultural machine position to the target position;

detecting a first obstacle disposed in the first target line between the agricultural machine position and the target position, the first obstacle having a first obstacle boundary that intersects the first target line at first and second intersections, the first intersection closer than the second intersection to the agricultural machine position;

obtaining a mitigation path around the first obstacle based on the first target line and the boundary of the first obstacle by:

determining a starting position of the mitigation path based on a second target line, the second target line extending from the agricultural machine position to the first obstacle boundary;

determining an ending position of the mitigation path based on a third target line, the third target line extending from the first obstacle boundary to the target position, wherein the mitigation path is obtained based on a length of at least one mitigation path segment;

obtaining an indexed path of a previous machine passage through the field, the indexed path comprising one or more segments aligned with crop rows to minimize crossing of crop rows;

determining a load of the agricultural machine; and editing the mitigation path to include the one or more segments of the indexed path according to the determined load of the agricultural machine when the load meets or exceeds a load threshold;

combining the mitigation path with the travel path to obtain a combined path, and controlling the agricultural machine using the combined path to guide the agricultural machine to the target position in the field.

20. The method of claim 19, wherein the target position comprises a position of a second agricultural machine, and the method further includes automatically updating the travel path by determining a new mitigation path responsive to a change in the position of the second agricultural machine.

21. The method of claim 19, further including obtaining map data that is indicative of the first obstacle boundary.

22. The method of claim 21, wherein the map data is indicative of a region enclosing the first obstacle.

23. The method of claim 22, where in the first obstacle boundary has a shape of first obstacle.

24. The method of claim 19, further including determining the first target line, the second target line, or detecting the first obstacle using at least one of:

a LIDAR device;

a radar device;

a camera;

a laser device; or a positioning device.

25. The method of claim 19, wherein the first target line includes a scan line that traverses the first obstacle.

26. The method of claim 19, wherein at least one mitigation segment of the mitigation path extends along a contour of the boundary of the first obstacle.

27. The method of claim 19, further including:

obtaining a set of entry scan lines, wherein an entry scan line extends from the agricultural machine position to a position on first obstacle boundary;

selecting an entry scan line from the set of entry scan lines based on:

an intersection of the selected entry scan line with the first obstacle; or a length of the selected entry scan line relative to other entry scan lines; and determining the starting position of the mitigation path based on the intersection of the selected entry scan line and the first obstacle boundary.

28. The method of claim 27, further including:

obtaining a sequential set of entry scan lines by sequentially scanning the field along the first obstacle boundary in a first direction to generate scan lines that extend from the agricultural machine position to one or more positions along the first obstacle boundary, wherein the selected entry scan line is a last scan line in the sequential set of entry scan lines that intersects the first obstacle boundary.

29. The method of claim 27, wherein the starting position of the mitigation path is a position at the intersection of the selected entry scan line and the first obstacle boundary.

30. The method of claim 19, further including:

obtaining a set of exit scan lines, wherein an exit scan line extends from a position on the first obstacle to the target position;

selecting an exit scan line from the set of exit scan lines based on at least one of:

an intersection of the exit scan line with the first obstacle; or a length of the exit scan line relative to other entry scan lines; and determining the ending position of the mitigation path based on the selected exit scan line.

31. The method of claim 30, further including:

obtaining sequential set of exit scan lines by sequentially scanning the field in a first direction from one or more positions along the first obstacle boundary to generate scan lines that extend from the one or more position along the first obstacle boundary to the target position, and selecting, as the selected exit scan line, a first scan line in the sequential set of exit scan lines that does not intersect the first obstacle boundary at any point between end points of the exit scan line.

32. The method of claim 30, wherein the ending position of the mitigation path is a position at the intersection of the selected entry scan line and the first obstacle boundary.

33. The method of claim 19, further including:

obtaining a transition path including a curved path that connects the agricultural machine position to the starting position of the mitigation path, wherein the curved path is determined based on at least one of a turning capability of the agricultural machine or a predetermined user experience parameter; and combining the transition path with the mitigation path.

34. The method of claim 19, further including:

obtaining an intercept path, the intercept path including:

a fourth target line, the fourth target line extending from the ending position of the mitigation path to an intercept point proximate the target point; and a curved path from the intercept point to the target point; and combining the intercept path with the mitigation path and the travel path.

35. The method of claim 19, further including adjusting a curvature of path segments in the travel path based on at least one of a curvature rate or a maximum curvature of the agricultural machine.

36. The method of claim 19, further including:

obtaining a second travel path for the agricultural machine to a target position in the field by:

projecting the agricultural machine position to a projected position on the travel path; and obtaining the second travel path by using the projected agricultural machine position as the agricultural machine position.

* * * * *